(12) United States Patent
Kanehara et al.

(10) Patent No.: US 12,168,626 B2
(45) Date of Patent: Dec. 17, 2024

(54) CHEMICALLY STRENGTHENED GLASS AND METHOD FOR PRODUCING SAME

(71) Applicant: AGC Inc., Tokyo (JP)

(72) Inventors: Kazuki Kanehara, Tokyo (JP); Eriko Maeda, Tokyo (JP); Takumi Umada, Tokyo (JP); Kenji Imakita, Tokyo (JP)

(73) Assignee: AGC Inc., Tokyo (JP)

( * ) Notice: Subject to any disclaimer, the term of this patent is extended or adjusted under 35 U.S.C. 154(b) by 637 days.

(21) Appl. No.: 17/305,169

(22) Filed: Jul. 1, 2021

(65) Prior Publication Data

US 2021/0323862 A1 Oct. 21, 2021

Related U.S. Application Data

(63) Continuation of application No. PCT/JP2020/000690, filed on Jan. 10, 2020.

(30) Foreign Application Priority Data

Jan. 18, 2019 (JP) ................................. 2019-007184
Aug. 2, 2019 (JP) ................................. 2019-142999

(51) Int. Cl.
*B32B 15/04* (2006.01)
*B32B 17/06* (2006.01)
(Continued)

(52) U.S. Cl.
CPC ............ *C03C 21/002* (2013.01); *C03C 3/085* (2013.01); *C03C 3/087* (2013.01); *C03C 3/093* (2013.01); *C03C 4/14* (2013.01)

(58) Field of Classification Search
CPC ................................................... C03C 21/002
(Continued)

(56) References Cited

U.S. PATENT DOCUMENTS 10,579,106 B2 * 3/2020 DeMartino ............. C03C 3/085
11,584,684 B2 * 2/2023 Dejneka ................. G06F 1/1637
(Continued)

FOREIGN PATENT DOCUMENTS

CN      102363567 A     2/2012
CN      102745896 A    10/2012
(Continued)

OTHER PUBLICATIONS

International Search Report issued Apr. 7, 2020 in PCT/JP2020/000690 filed on Jan. 10, 2020, 2 pages.

*Primary Examiner* — Lauren R Colgan
(74) *Attorney, Agent, or Firm* — Oblon, McClelland, Maier & Neustadt, L.L.P.

(57) ABSTRACT

The present invention relates to a chemically strengthened glass having a sheet shape, having a compressive stress layer on a glass surface, having a compressive stress value on the glass surface of 800 MPa or more, having a sheet thickness (t) of 100 μm or more, having a depth of the compressive stress layer (DOL) of (t×0.1) μm or more, and satisfying: $CS_B > CS_A > 0$, where $D_B$ is a depth in a range of 10 μm or more and not more than DOL from the glass surface, at which a compressive stress value is maximum; $CS_B$ is the compressive stress value at the depth $D_B$; $D_A$ is a depth in a range of equal to or less than $D_B$ from the glass surface, at which a compressive stress value is minimum; and $CS_A$ is the compressive stress value at the depth $D_A$.

19 Claims, 6 Drawing Sheets

(51) Int. Cl.
*C03C 3/085* (2006.01)
*C03C 3/087* (2006.01)
*C03C 3/093* (2006.01)
*C03C 4/14* (2006.01)
*C03C 21/00* (2006.01)

(58) Field of Classification Search
USPC .................................................. 428/410, 426
See application file for complete search history.

(56) References Cited

U.S. PATENT DOCUMENTS

| | | | |
|---|---|---|---|
| 11,639,308 B2* | 5/2023 | Imakita | C03C 4/20 428/215 |
| 11,780,758 B2* | 10/2023 | Gallagher | C03B 17/06 65/53 |
| 11,820,701 B2* | 11/2023 | Allan | C03C 21/005 |
| 2010/0009154 A1* | 1/2010 | Allan | C03C 3/093 501/67 |
| 2011/0312483 A1 | 12/2011 | Nakashima. et al. | |
| 2012/0052271 A1 | 3/2012 | Gomez et al. | |
| 2012/0264585 A1 | 10/2012 | Ohara et al. | |
| 2013/0224492 A1* | 8/2013 | Bookbinder | C03C 21/002 65/30.14 |
| 2014/0364298 A1 | 12/2014 | Ohara et al. | |
| 2015/0030838 A1 | 1/2015 | Sellier et al. | |
| 2015/0030840 A1 | 1/2015 | Gomez et al. | |
| 2016/0023944 A1* | 1/2016 | Bookbinder | C03C 23/007 428/220 |
| 2017/0158556 A1* | 6/2017 | Dejneka | G06F 1/1637 |
| 2017/0174551 A1* | 6/2017 | Lambricht | C03C 4/18 |
| 2017/0174556 A1 | 6/2017 | Miyabe et al. | |
| 2017/0197869 A1* | 7/2017 | Beall | B32B 17/06 |
| 2017/0273201 A1* | 9/2017 | Eckart | C03C 4/18 |
| 2017/0297956 A1* | 10/2017 | Bookbinder | C03C 23/007 |
| 2017/0355640 A1* | 12/2017 | Oram | C03C 4/18 |
| 2018/0127304 A1* | 5/2018 | Gross | C03C 21/002 |
| 2018/0147114 A1* | 5/2018 | DeMartino | C03C 3/087 |
| 2018/0186685 A1* | 7/2018 | Murayama | C03C 3/083 |
| 2018/0265397 A1 | 9/2018 | Murayama et al. | |
| 2018/0319706 A1 | 11/2018 | Murayama et al. | |
| 2018/0327304 A1* | 11/2018 | Murayama | C03C 21/00 |
| 2019/0161386 A1* | 5/2019 | Gross | C03C 3/091 |
| 2019/0194057 A1 | 6/2019 | Murayama et al. | |
| 2019/0202730 A1 | 7/2019 | Gomez et al. | |
| 2019/0263713 A1 | 8/2019 | Murayama et al. | |
| 2019/0292099 A1 | 9/2019 | Murayama et al. | |
| 2019/0300422 A1* | 10/2019 | Guo | G02F 1/133308 |
| 2020/0109083 A1* | 4/2020 | Imakita | C03C 3/091 |
| 2021/0053867 A1 | 2/2021 | Murayama et al. | |

FOREIGN PATENT DOCUMENTS

| | | |
|---|---|---|
| CN | 104169231 A | 11/2014 |
| CN | 109133670 A | 1/2019 |
| JP | 2013-536155 A | 9/2013 |
| JP | 2015-511573 A | 4/2015 |
| WO | WO 2015/162845 A1 | 10/2015 |
| WO | WO 2019/004124 A1 | 1/2019 |

* cited by examiner

CHEMICALLY STRENGTHENED GLASS AND METHOD FOR PRODUCING SAME

TECHNICAL FIELD

The present invention relates to a chemically strengthened glass and a manufacturing method thereof.

BACKGROUND ART

A chemically strengthened glass is used for a cover glass, etc. of a portable terminal. The chemically strengthened glass is a glass obtained by bringing a glass into contact with a molten salt of sodium nitrate, etc. to cause ion exchange between alkali metal ions contained in the glass and alkali metal ions having a larger ionic radius contained in the molten salt, thereby forming a compressive stress layer in a glass surface portion. The strength of the chemically strengthened glass strongly depends on the stress profile represented by a compressive stress value using, as a variable, the depth from the glass surface.

The cover glass of a portable terminal, etc. is sometimes broken due to deformation, for example, upon falling. In order to prevent such a breakage (a bending-mode fracture), it is effective to increase the compressive stress in the glass surface.

In addition, the cover glass of a portable terminal, etc. is sometimes broken by collision with a projection at the time of falling of the terminal onto asphalt or sand. In order to prevent such breakage (impact-mode fracture), it is effective to form the compressive stress layer down to a deeper portion of the glass by increasing the depth of the compressive stress layer.

However, when a compressive stress layer is formed in a glass surface portion, a tensile stress corresponding to the surface compressive stress is inevitably generated in the central part of the glass. If this tensile stress value is too large, the glass is explosively broken upon fracture, and fragments thereof are scattered. Accordingly, the chemically strengthened glass is designed to provide a large surface compressive stress and form a compressive stress down to a deeper portion while preventing an excessive increase in the total amount of compressive stress of the surface layer.

Patent Literature 1 describes a method in which two-step chemical strengthening is performed using a lithium-containing glass for chemical strengthening. This method enables generating a large compressive stress in a surface portion of the glass through sodium-potassium exchange and generating a slightly small compressive stress in a deeper portion through lithium-sodium exchange. It is expected that both a bending-mode fracture and an impact-mode fracture can thereby be suppressed.

Patent Literature 2 describes a special stress profile in which a local maximum of the compressive stress value is present. This profile can be realized through two ion-exchange treatments and a heat treatment at a temperature lower than the strain point of the glass.

In the manufacturing process of a portable terminal, a protective film is sometimes attached to a cover glass surface for the purpose of preventing scratching in the cover glass surface during transportation. However, at the time of removing the protective film from the cover glass surface, a trouble sometimes occurs in an electronic device due to the effect of static electricity.

CITATION LIST

Patent Literature

Patent Literature 1: JP-T-2013-536155 (the term "JP-T" as used herein means a published Japanese translation of a PCT patent application)
Patent Literature 2: JP-T-2015-511573

SUMMARY OF INVENTION

Technical Problem

An object of the present invention is to provide a chemically strengthened glass capable of preventing scattering of fragments upon breakage while sufficiently suppressing both a bending-mode fracture and an impact-mode fracture, and a manufacturing method thereof. In addition, an object of the present invention is to provide a glass for chemical strengthening, which is suitable for the manufacture of the chemically strengthened glass above.

Solution to Problem

The present invention provides a chemically strengthened glass having a sheet shape,
  having a compressive stress layer on a surface of the glass,
  having a compressive stress value ($CS_0$) on the surface of the glass of 800 MPa or more,
  having a sheet thickness (t) of 100 μm or more,
  having a depth of the compressive stress layer (DOL) of (t×0.1) μm or more, and satisfying the following relation:

$$CS_B > CS_A > 0,$$

where $D_B$ is a depth at which a compressive stress value is maximum, the depth being in a range of 10 μm or more and not more than DOL from the surface of the glass; $CS_B$ is the compressive stress value at the depth $D_B$; $D_A$ is a depth at which a compressive stress value is minimum, the depth being in a range of equal to or less than $D_B$ from the surface of the glass; and $CS_A$ is the compressive stress value at the depth $D_A$.

Also, the present invention provides a method of manufacturing a chemically strengthened glass, the method including:
  immersing a glass sheet including a lithium aluminosilicate glass in a sodium-containing salt at 380° C. to 500° C. for 1 to 8 hours; and
  immersing the glass in a potassium-containing salt to obtain the chemically strengthened glass,
  in which the sodium-containing salt includes 50 mass % or more of sodium ions assuming that a mass of metal ions in a molten salt is 100 mass %.

In addition, the present invention provides a method of manufacturing a chemically strengthened glass, the method including bringing a glass for chemical strengthening into contact with a sodium-containing salt at 380 to 500° C., then bringing the glass for chemical strengthening into contact with a potassium-containing salt at 380 to 500° C.,
  in which the glass for chemical strengthening includes, in mol % on an oxide basis:
  from 50 to 70% of $SiO_2$;
  from 7 to 25% of $Al_2O_3$;
  from 2 to 20% of $Li_2O$;
  from 0 to 4% of $Na_2O$;

from 2 to 8% of $K_2O$;
from 0 to 10% of $B_2O_3$;
from 0 to 10% of $P_2O_5$;
in a case of including any one or more kinds of MgO, ZnO, CaO, SrO, and BaO, 15% or less of these in total; and
in a case of including either one or more kinds of $ZrO_2$ and $TiO_2$, 5% or less of these in total,
the sodium-containing salt includes 80% or more of sodium ions assuming that a mass of metal ions contained in the sodium-containing salt is 100%, and
a contact time with the potassium-containing salt is shorter than a contact time with the sodium-containing salt.

Furthermore, the present invention provides a glass for chemical strengthening including, in mol % on an oxide basis:
from 58 to 70% of $SiO_2$;
from 7 to 20% of $Al_2O_3$;
from 2 to 20% of $Li_2O$;
from 0 to 2% of $Na_2O$;
from 2 to 6% of $K_2O$;
from 0 to 2% of $B_2O_3$;
from 0 to 2% of $P_2O_5$;
from 0.1 to 3% of either one or more kinds of $ZrO_2$ and $TiO_2$ in total; and
in a case of including one or more kinds selected from MgO, ZnO, CaO, SrO and BaO, from 0 to 15% of these in total,
or a glass for chemical strengthening including, in mass % on an oxide basis:
from 45 to 70% of $SiO_2$;
from 10 to 25% of $Al_2O_3$;
from 2.5 to 10% of $Li_2O$;
from 0 to 4% of $Na_2O$;
from 2 to 10% of $K_2O$;
from 0 to 10% of $B_2O_3$;
from 0 to 10% of $P_2O_5$;
from 0.2 to 5% of either one or more kinds of $ZrO_2$ and $TiO_2$ in total; and
in a case of including one or more kinds selected from MgO, ZnO, CaO, SrO and BaO, from 0 to 15% of these in total.

Advantageous Effects of Invention

According to the present invention, a chemically strengthened glass in which both a bending-mode fracture and an impact-mode fracture are sufficiently suppressed and scattering of fragments upon breakage is also suppressed, is provided.

BRIEF DESCRIPTION OF DRAWINGS

In FIG. 6, the units of numerical values indicating the length of each width are all mm.

DESCRIPTION OF EMBODIMENTS

Figure 1:
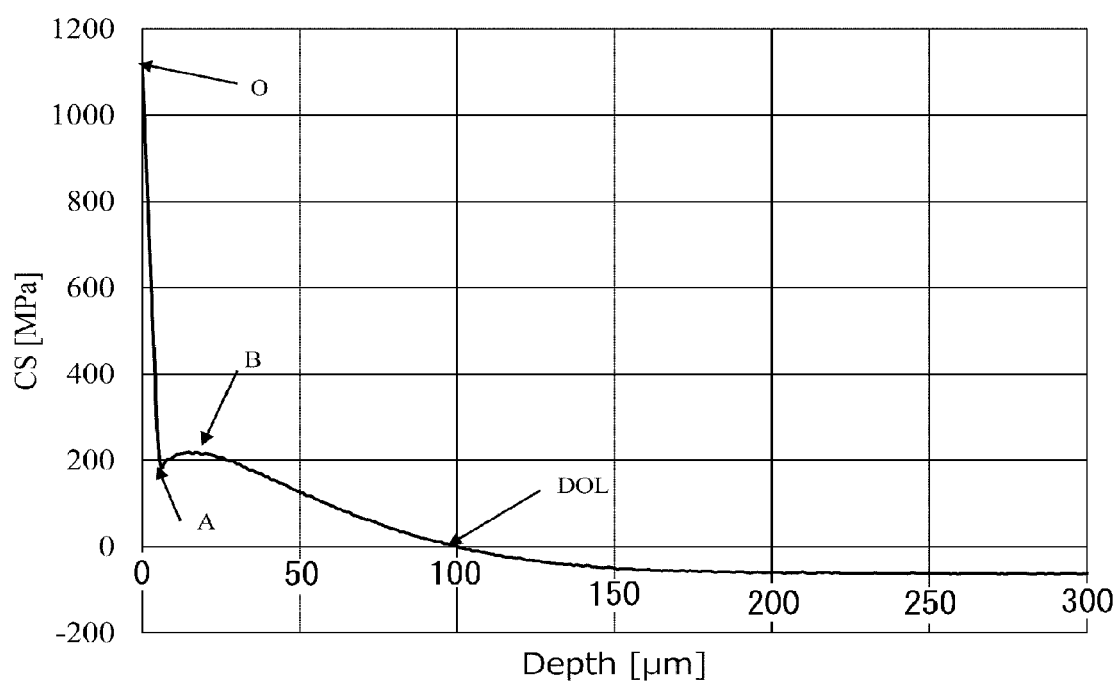
FIG. 1 is a diagram illustrating a stress profile of the chemically strengthened glass.

In the present description, the term "to" indicating the numerical range is used in the sense of including the numerical values before and after "to" as the lower limit value and the upper limit value. In the present description, the "to" is hereinafter used in the same sense unless otherwise indicated.

In the present description, the "stress profile" indicates a profile representing the compressive stress value using, as a variable, the depth from the glass surface. The "depth of compressive stress layer DOL" is a depth at which the compressive stress value CS becomes zero. In addition, the depth at which the compressive stress value measured by the later-described optical-waveguide surface stress meter becomes zero is denoted as "$D_K$". "$D_K$" is considered to be a depth to which potassium ions have intruded through an ion exchange treatment. The "internal tensile stress CT" indicates a tensile stress value at a depth corresponding to ½ of the sheet thickness t of the glass.

In the present description, the stress profile can be measured by a method using an optical-waveguide surface stress meter and a birefringence stress meter in combination.

The method using an optical-waveguide surface stress meter is known to enable accurately measuring the stress of the glass in a short time. Examples of the optical-waveguide surface stress meter include FSM-6000 manufactured by Orihara Manufacturing Co., Ltd. When the software Fsm-V attached to FSM-6000 is combined, high-accuracy stress measurement can be performed.

However, in principle, the optical-waveguide surface stress meter can measure the stress only when the refractive index decreases from the sample surface toward the inside. In the chemically strengthened glass, the refractive index of a layer obtained by replacing sodium ions inside the glass with potassium ions on the outside decreases from the sample surface toward the inside and therefore, the stress can be measured by the optical-waveguide surface stress meter. However the stress of a layer obtained by replacing lithium ions inside the glass with sodium ion on the outside cannot be measured by the optical-waveguide surface stress meter. Consequently, in the case where an ion exchange treatment using a sodium-containing molten salt is performed on a lithium-containing glass, the depth ($D_K$) at which the compressive stress value measured by the optical-waveguide surface stress meter becomes 0 is not a true depth of compressive stress layer.

In the method using a birefringence stress meter, the stress can be measured irrespective of the refractive index distribution. Examples of the birefringence stress meter include a birefringence imaging system, Abrio-IM, manufactured by Cri, Inc. However, in order to measure the stress by the birefringence stress meter, the glass sample must be processed into a thin section. Since particularly an edge portion can hardly be accurately processed, it is difficult to accurately determine the stress value near the glass surface. An accurate stress measurement becomes possible by using two kinds of measuring devices in combination.

In the present description, the "chemically strengthened glass" indicates a glass after a chemical strengthening treatment is applied, and the "glass for chemical strengthening" indicates a glass before a chemical strengthening treatment is applied.

In the present description, the "base composition of a chemically strengthened glass" indicates a glass composition of a glass for chemical strengthening. Except for the case where an extreme ion exchange treatment is applied, the glass composition in a portion deeper than DOL of the chemically strengthened glass is the base composition of the chemically strengthened glass.

In the present description, the glass composition is expressed in mass % on an oxide basis or in mol % on an oxide basis. Also, in the present description, the phrase "contains substantially no" means to be below the level of impurities contained in raw materials, etc., that is, to be not intentionally incorporated. Specifically, the content is, for example, less than 0.1 mass %.

<Chemically Strengthened Glass>

The chemically strengthened glass of the present invention (hereinafter, sometimes referred to as "present strengthened glass") preferably has a sheet shape and usually has a flat sheet shape but may have a curved surface shape.

In the present strengthened glass, the compressive stress value ($CS_0$) of the glass surface is preferably 800 MPa or more, more preferably 900 MPa or more, still more preferably 950 MPa or more, yet still more preferably 1,000 MPa or more. The "bending-mode fracture" can be more successfully prevented as $CS_0$ is larger.

On the other hand, if the compressive stress value of the surface layer is too much increased, the edge may be chipped after chemical strengthening. This phenomenon is sometimes referred to as delayed chipping. For preventing the delayed chipping, $CS_0$ is preferably 1,400 MPa or less, more preferably 1,300 MPa or less, still more preferably 1,200 MPa or less.

The sheet thickness (t) of the present strengthened glass is 100 μm or more, preferably 400 μm or more, more preferably 600 μm or more, still more preferably 700 μm or more. As t is larger, breakage is less likely to occur. In the case of using the present strengthened glass for a portable terminal, etc., in order to reduce the weight, t is preferably 2,000 μm or less, more preferably 1,000 μm or less.

In the present strengthened glass, the depth of compressive stress layer (DOL) is preferably (t×0.1) μm or more, more preferably (t×0.12) μm or more, still more preferably (t×0.14) μm or more. When DOL is large relative to t, the effects of chemical strengthening are increased.

On the other hand, if DOL is too large relative to t, CT increases and fragments are easily scattered upon breakage of the glass. Therefore, DOL is preferably (t×0.25) μm or less, more preferably (t×0.22) μm or less, still more preferably (t×0.20) μm or less.

In addition, DOL is preferably 50 μm or more. General projections of asphalt are about 50 μm in height and therefore, when DOL is 50 μm or more, an impact-mode fracture upon collision with asphalt of roads, etc. can be suppressed.

In the present strengthened glass, the depth ($D_K$) at which the compressive stress value measured by an optical-waveguide surface stress meter becomes zero is preferably 3 μm or more, because the bending-mode fracture can be suppressed. $D_K$ is more preferably 4 m or more, still more preferably 5 μm or more. If $D_K$ is too large, there is a concern that CT increases. Therefore $D_K$ is preferably 20 μm or less, more preferably 15 μm or less, still more preferably 10 μm or less. Incidentally, a positive correlation is usually present between $D_K$ and DOL, and there is a tendency that DOL increases as $D_K$ is larger.

FIG. 1 illustrates an example of the stress profile of the present strengthened glass. In FIG. 1, O is a point indicating the compressive stress value of the glass surface, B is a point of a depth at which the compressive stress value becomes maximum in a range of 10 μm or more and DOL or less from the glass surface, and A is a point of a depth at which the stress value becomes minimum in a range of shallower than point B from the glass surface. In the present strengthened glass, a relation of $CS_B > CS_A$ is satisfied where $CS_B$ is the compressive stress value at point B and $CS_A$ is the compressive stress value at point A.

Figure 2:
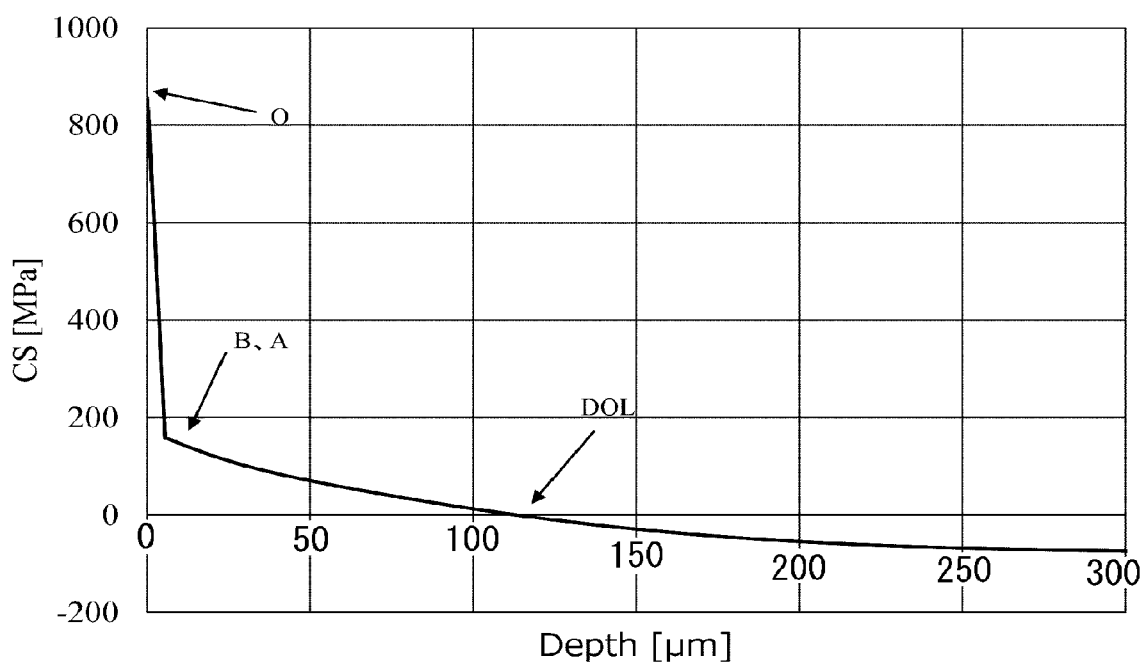
FIG. 2 is a diagram illustrating a stress profile of the chemically strengthened glass.

For example, in the conventional typical stress profile described in Patent Literature 1, as the depth increases, CS becomes smaller over the entire range from the glass surface to DOL. FIG. 2 is an example of such a stress profile. In this case, the depth at which the compressive stress value becomes maximum in a range of 10 μm or more and DOL or less from the glass surface is 10 μm, and the depth at which the compressive stress value becomes minimum in a range of 0 μm or more and 10 μm or less from the glass surface is 10 μm as well. Namely, point B and point A coincide. In turn, naturally, $CS_B = CS_A$ holds.

The stress profile of the present strengthened glass has point B of a depth at which the stress becomes maximum in a range of 10 μm or more and DOL or less from the glass surface, and point A of a depth at which the stress becomes minimum in a range of 0 μm or more and $D_B$ or less from the glass surface. In this way, a local maximum point and a local minimum point are present and therefore, $CS_B$ and $CS_A$ do not coincide. In addition, since a relation of $CS_B > CS_A$ is satisfied, high strength is obtained.

In the present strengthened glass, a relation of $CS_A > 0$ is preferably satisfied. According to the studies of the present inventors, in order to prevent the "bending-mode fracture", it is important that the compressive stress value in a shallow region at 10 μm or less from the glass surface is large, and when $CS_A > 0$ is satisfied, the bending-mode fracture is effectively suppressed.

In addition, according to the studies of the present inventors, in order to prevent the impact-mode fracture, it is effective that the compressive stress value at a depth of 50 μm to 80 μm from the glass surface is large. On the other hand, the compressive stress value in the region at a depth of 10 μm or more and less than 50 μm from the glass surface is considered to less contribute to the suppression of breakage. Accordingly, when a local minimum point of the compressive stress is present in the range of 10 μm or more and less than 50 μm from the glass surface (that is, when $D_A$ is 10 μm or more and less than 50 μm), this is more preferred because the compressive stress can be utilized without waste. The depth $D_A$ of point A is still more preferably present in the range of 10 to 30 μm.

In the present strengthened glass, the compressive stress value $CS_{50}$ (can be measured by a birefringence stress meter) at a depth of 50 μm from the surface layer of the glass is preferably 60 MPa or more, because the impact-mode fracture can be suppressed. The compressive stress value $CS_{50}$ above is more preferably 80 MPa or more. On the other hand, when a large compressive stress layer is formed inside of the glass, a tensile stress corresponding to the surface compressive stress inevitably increases in the central part of the glass. If this tensile stress value is excessively increased, explosive shattering occurs when the glass is broken, and fragments scatter. Accordingly, the compressive stress value $CS_{50}$ is preferably 400 MPa or less, more preferably 200 MPa or less.

In the present strengthened glass, the compressive stress value $CS_{50}$ at a depth of 50 μm from the surface layer of the glass is preferably (t×0.1) MPa or more. In order to suppress the impact-mode fracture, the larger $CS_{50}$ is, the better. In order to prevent crushing upon breakage while suppressing also the bending-mode fracture, it is preferable to consider the balance corresponding to the sheet thickness t.

In the present strengthened glass, the area $S\Delta$ of the triangle formed by three points, i.e., point O indicating the stress value of the glass surface and the above-described points A and B, is preferably 300 MPa·µm or more. The area $S\Delta$ of the triangle indicates the amount of compressive stress cut out due to providing a local minimum point of the stress value. In order to prevent the generation of useless compressive stress less contributing to the suppression of bending-mode fracture as well as to the suppression of impact-mode fracture, it is preferable to make $S\Delta$ large.

$S\Delta$ is more preferably 1,000 MPa·µm or more, still more preferably 2,000 MPa·µm or more, particularly preferably 5,000 MPa·µm or more. If $S\Delta$ is too large, the strength is reduced, and therefore, $S\Delta$ is preferably 40,000 MPa·µm or less, more preferably 30,000 MPa·µm or less, still more preferably 20,000 MPa·µm or less.

Also, in the present chemically strengthened glass, when it is processed into a square shape with one side of 30 mm and a diamond indenter having a tip angle of 90° is struck thereon while applying a minimum load at which breakage occur, the crushing number produced is preferably 10 or less. That is, it is required to suppress the tensile stress (CT) generated in response to the compressive stress to fall within the limit causing no explosive breakage while having a sufficient compressive stress layer capable of suppressing the breakage as described above. Here, the limit of CT value not causing explosive breakage is sometimes referred to as CT-limit.

According to the present inventors, in a crushing test where a sheet-shaped chemically glass sheet is processed into a square shape with one side of 30 mm and a diamond indenter having a tip angle of 90° is struck on the glass while applying a minimum load at which breakage occur, when the crushing number is preferably 10 or less, the tensile stress (CT) inside the chemically strengthened glass is regarded as being not more than CT-limit. Here, when the glass is not broken in the crushing test, the test is repeated while gradually increasing the load applied to the indenter, and the number of fragments at the minimum load at which breakage occur is defined as the crushing number.

The crushing number by the crushing test is more preferably 7 or less. Incidentally, since the CT-limit value depends on the glass composition, the preferable CT value for not causing explosive crushing also varies depending on the glass composition but is preferably about 90 MPa or less, more preferably 80 MPa or less.

The present strengthened glass is preferably a lithium aluminosilicate glass. In the lithium aluminosilicate glass, it is possible to generate a large compressive stress in the surface portion of the glass through sodium-potassium exchange and generate a slightly small compressive stress in a deeper portion through lithium-sodium exchange. Consequently, both of flexural fracture and breakage from collision with a projection can be suppressed.

In the present strengthened glass, it is preferred that the glass composition of a central portion in the thickness direction includes, in mass %, 50% or more of $SiO_2$ and 5% or more of $Al_2O_3$,
the total content of $Li_2O$, $Na_2O$ and $K_2O$ is 5% or more, and
the molar ratio of the content of $Li_2O$ to the total content of $Li_2O$, $Na_2O$ and $K_2O$ is 0.5 or more.

In addition, the glass composition of a central portion in the thickness direction is preferably a composition of the later-described glass for chemical strengthening.

The chemically strengthened glass of the present invention is useful particularly as a cover glass used in mobile devices such as mobile phone and smartphone. Furthermore, it is useful as well for a cover glass of display devices not intended to be carried, such as television, personal computer and touch panel, and for a wall surface of elevator cages and a wall surface (full-surface display) of architectural structures such as house and building. In addition, the chemically strengthened glass of the present invention is useful also for applications including, for example, architectural materials such as windowpane, table tops, interior components for motor vehicles, airplanes, etc., cover glasses thereof, and housings having a curved surface shape.

<Manufacturing Method of Chemically Strengthened Glass>

The present strengthened glass can be manufactured by applying an ion exchange treatment to the later-described glass for chemical strengthening. The glass for chemical strengthening can be manufactured, for example, by using the following general glass manufacturing method.

Glass raw materials are prepared so as to obtain a glass having a preferable composition and melted by heating in a glass melting furnace. Thereafter, the glass is homogenized, for example, by bubbling, stirring, or addition of a refining agent, then formed into a glass sheet having a predetermined thickness, and annealed. Alternatively, the glass may be formed into a sheet shape by a method of forming the glass into a block shape, annealing the glass block, and then cutting it.

Examples of the method of forming the glass into a sheet shape include, a float process, a pressing process, a fusion process, and a downdraw process. Among these, a float process is preferred in the case of manufacturing a large glass sheet. In addition, a continuous forming method other than the float process, such as fusion process and downdraw process, is also preferred.

The glass ribbon obtained by shape forming is ground and polished as necessary to form a glass sheet. Incidentally, in the case of cutting the glass sheet into a predetermined shape and size or in the case of chamfering the glass sheet, when the cutting or chamfering of the glass sheet is performed before applying the later-described chemical strengthening treatment, a compressive stress layer is advantageously formed also in end faces by the chemical strengthening treatment. The glass sheet formed is subjected to a chemical strengthening treatment, then washed and dried, and a chemically strengthened glass is thereby obtained.

The chemical strengthening treatment is generally a treatment of bringing a glass into contact with a metal salt, for example, by a method such as immersion in a molten metal salt containing metal ions having a large ionic radius, to replace metal ions having a small ionic radius in the glass with the metal ions having a large ionic radius in the metal salt. The present invention also utilizes an action of replacing metal ions having a large ionic radius (typically, potassium ion) in the glass with metal ions having a small ionic radius (typically, sodium ion) in the metal salt.

In the present method, a glass for chemical strengthening composed of a lithium aluminosilicate glass is brought into contact with a sodium-containing salt and thereby strengthened. More specifically, "Li—Na exchange" of replacing lithium ions in the glass with sodium ions is utilized. This method is preferred, because the chemical strengthening treatment speed is high.

In this case, examples of the sodium-containing salt include a nitrate, a sulfate, a carbonate, and a chloride. One of these salts may be used alone, or a plurality of kinds of them may be used in combination. The sodium-containing salt is preferably a salt including 50% or more of sodium ions assuming that the mass of metal ions contained in the salt is 100%. The content of sodium ions is preferably 75% or more, more preferably 80% or more.

Also, in the sodium-containing salt, the potassium ion content is preferably 50% or less, more preferably 25% or less, still more preferably 20% or less, assuming that the mass of metal ions contained in the salt is 100%. Use of such a strengthening salt (salt for chemical strengthening) makes it possible to form a high compressive stress layer in a deep layer portion of the glass and at the same time, eliminate a stress unnecessary for the "impact-induced glass breakage mode" by reverse exchange. The sodium-containing salt is preferably a sodium-containing nitrate in view of ease of handling, such as boiling point and danger.

In addition, in order to form a large compressive stress by ion exchange, it is preferable to use a method utilizing "Na·K exchange" of replacing sodium ions in the glass with potassium ions. Furthermore, in order to provide a stress profile having a positive slope in the region of 10 to 50 μm, it is preferable to utilize "K·Na exchange" of exchanging potassium ion in the glass with sodium ions.

Examples of the molten salt for performing the chemical strengthening treatment include a nitrate, a sulfate, a carbonate, and a chloride. Among these, examples of the nitrate include lithium nitrate, sodium nitrate, potassium nitrate, cesium nitrate, and silver nitrate. Examples of the sulfate include lithium sulfate, sodium sulfate, potassium sulfate, cesium sulfate, and silver sulfate. Examples of the carbonate include lithium carbonate, sodium carbonate, and potassium carbonate. Examples of the chloride include lithium chloride, sodium chloride, potassium chloride, cesium chloride, and silver chloride. One of these molten salts may be used alone, or a plurality of kinds of them may be used in combination.

More specifically, the present strengthened glass can be manufactured by the strengthening treatment method described below (hereinafter, referred to as "present strengthening treatment method"). The present method preferably includes a step of immersing a glass sheet in a sodium-containing salt.

The present strengthening treatment includes a step of immersing a glass sheet in a sodium-containing salt. The sodium-containing salt is preferably a salt including 50 mass % or more, more preferably 75 mass % or more, of sodium ions assuming that the mass of metal ions contained in the salt is 100 mass %. Use of such a strengthening salt makes it possible to form a high compressive stress layer in a deep layer portion of the glass and at the same time, eliminate a stress unnecessary for the "impact-induced glass breakage mode" by reverse exchange. The sodium-containing salt is preferably a sodium-containing nitrate in view of ease of handling, such as boiling point and danger.

The strengthening salt preferably includes sodium nitrate and may include, as a component other than sodium nitrate, a nitrate of an alkali metal or an alkaline earth metal, such as potassium nitrate, magnesium nitrate, and lithium nitrate.

In the present strengthening treatment method, it is preferable to immerse a glass sheet in a sodium-containing salt at 380° C. to 500° C. When the temperature of the sodium-containing salt is 380° C. or more, this advantageously facilitates the progress of ion exchange. The temperature is more preferably 400° C. or more. In addition, when the temperature of the sodium-containing salt is 500° C. or less, excessive stress relaxation of the surface layer can advantageously be suppressed. The temperature is more preferably 480° C. or less.

The immersing time of the glass in the sodium-containing salt is preferably 1 hour or more, because the surface compressive stress increases. The immersing time is more preferably 2 hours or more, still more preferably 3 hours or more. If the immersing time is too long, not only the productivity decreases but also the compressive stress may be reduced due to a relaxation phenomenon. In order to increase the compressive stress, the immersing time is preferably 8 hours or less, more preferably 6 hours or less, still more preferably 4 hours or less.

The present strengthening treatment method includes also a step of immersing the glass sheet in a potassium-containing salt. The potassium-containing salt is preferably a salt including 50 mass % or more, more preferably 75 mass % or more, of potassium ions assuming that the mass of metal ions contained in the salt is 100 mass %. Use of such a strengthening salt makes it possible to form a high compressive stress layer in a surface layer of the glass and therefore, can suppress the "bending-induced glass breakage mode". The potassium-containing salt is preferably a potassium-containing nitrate in view of ease of handling.

The immersing time of the glass in the potassium-containing salt is preferably shorter than the immersing time in the sodium-containing salt so as to retain the characteristics of the stress profile prepared by the sodium salt treatment. In addition, when the immersing time of the glass in the potassium-containing salt is 4 hours or less, this is preferable because the stress in the portion of 20 to 50 μm can be appropriately adjusted. The immersing time is more preferably 3 hours or less, still more preferably 2 hours or less. If the immersing time is too short, a sufficient compressive stress is not provided in the outermost surface layer of the glass. In order for a sufficient compressive stress to be provided in the outermost surface layer of the glass, the immersing time is preferably 30 minutes or more, more preferably 45 minutes or more, still more preferably 1 hour or more.

After the immersion in the sodium- or potassium-containing salt, the glass sheet is preferably held at a temperature of 300° C. or less, because if a high temperature of more than 300° C. is employed, the compressive stress generated by the ion exchange treatment is reduced due to a relaxation phenomenon. The holding temperature of the glass sheet after immersion in the potassium-containing salt is more preferably 250° C. or less, still more preferably 200° C. or less.

<Glass for Chemical Strengthening>

The glass for chemical strengthening according to the present invention (hereinafter, sometimes referred to as the present glass for strengthening) is preferably a lithium aluminosilicate glass. More specifically, it is preferred that the glass includes, in mass % on an oxide bases, 50% or more of $SiO_2$ and 5% or more of $Al_2O_3$, the total content of $Li_2O$, $Na_2O$ and $K_2O$ is 5% or more, and the molar ratio of the content of $Li_2O$ to the total content of $Li_2O$, $Na_2O$ and $K_2O$ is 0.5 or more.

The present glass for strengthening preferably includes, in mass % on an oxide basis, from 50 to 80% of $SiO_2$,
from 5 to 25% of $Al_2O_3$,
from 2 to 20% of $Li_2O$,
from 1.5 to 10% of $Na_2O$, from 1 to 12% of $K_2O$,
from 0 to 10% of $B_2O_3$,
from 0 to 10% of $P_2O_5$,
in the case of including any one or more kinds of MgO, ZnO, CaO, SrO, and BaO, 10% or less of these in total, and
in the case of including either one or more kinds of $ZrO_2$ and $TiO_2$, 5% or less of these in total.

More specifically, the present glass for strengthening is preferably glass A including, in mass % on an oxide basis,
from 45 to 75% of $SiO_2$,
from 10 to 25% of $Al_2O_3$,
from 2 to 10% of $Li_2O$,
from 0 to 4% of $Na_2O$,
from 2 to 10% of $K_2O$,
from 0 to 10% of $B_2O_3$,
from 0 to 10% of $P_2O_5$,
in the case of including any one or more kinds of MgO, ZnO, CaO, SrO, and BaO, 15% or less of these in total, and
in the case of including either one or more kinds of $ZrO_2$ and $TiO_2$, 5% or less of these in total.

Also, the present glass for strengthening is preferably glass B including, in mol % on an oxide basis,
from 50 to 75% of $SiO_2$,
from 7 to 25% of $Al_2O_3$,
from 2 to 20% of $Li_2O$,
from 0 to 4% of $Na_2O$,
from 2 to 8% of $K_2O$,
from 0 to 10% of $B_2O_3$,
from 0 to 10% of $P_2O_5$,
in the case of including any one or more kinds of MgO, ZnO, CaO, SrO, and BaO, 15% or less of these in total, and
in the case of including either one or more kinds of $ZrO_2$ and $TiO_2$, 5% or less of these in total.

In addition, the present glass for strengthening is preferably glass C including, in mol % on an oxide basis,
from 58 to 70% of $SiO_2$,
from 7 to 20% of $Al_2O_3$,
from 0 to 2% of $B_2O_3$,
from 0 to 2% of $P_2O_5$,
from 2 to 20% of $Li_2O$,
from 0 to 2% of $Na_2O$,
from 2 to 6% of $K_2O$,
from 0.1 to 3% of $ZrO_2+TiO_2$,
1% or less of $TiO_2$,
from 0 to 15% of MgO+ZnO+CaO+SrO+BaO,
1% or less of SrO, and 1% or less of BaO.

These glasses easily form a preferable stress profile by the chemical strengthening treatment. These preferable glass compositions are described below.

$SiO_2$ is a component constituting the glass framework. In addition, this is a component enhancing the chemical durability and is a component reducing the generation of cracks when the glass surface gets scratched. In order to increase the chemical durability, the content of $SiO_2$ is preferably 45 mass % or more, preferably 50 mass % or more, more preferably 55 mass % or more, still more preferably 58 mass % or more.

In mol %, the content of $SiO_2$ is preferably 50 mol % or more, more preferably 58 mol % or more, still more preferably 60 mol % or more, particularly preferably 63 mol % or more.

In order to improve the meltability of the glass, the content of $SiO_2$ is preferably 75 mass % or less, more preferably 70 mass % or less, still more preferably 66 mass % or less.

Also, the content of $SiO_2$ is preferably 75 mol % or less, more preferably 72 mol % or less, still more preferably 70 mol % or less.

In order to enhance the ion exchange property during chemical strengthening and increase the surface compressive stress after strengthening or in order to raise the glass transition temperature (Tg) and increase the Young's modulus, the content of $Al_2O_3$ is preferably 10 mass % or more, more preferably 13 mass % or more, still more preferably 16 mass % or more.

The content of $Al_2O_3$ is preferably 7 mol % or more, more preferably 10 mol % or more, still more preferably 12 mol % or more.

In addition, in order to lower the melting temperature, the content of $Al_2O_3$ is preferably 25 mass % or less, more preferably 23 mass % or less, still more preferably 20 mass % or less.

Also, the content of $Al_2O_3$ is preferably 25 mol % or less, more preferably 20 mol % or less, still more preferably 15 mol % or less.

$Li_2O$ is a component forming a surface compressive stress through ion exchange and is an essential component of the lithium aluminosilicate glass. A chemically strengthened glass having a preferable stress profile is obtained by chemically strengthening the lithium aluminosilicate glass. In order to increase the depth of compressive stress layer DOL, the content of $Li_2O$ is preferably 2 mass % or more, more preferably 3 mass % or more, still more preferably 5 mass % or more.

Also, the content of $Li_2O$ is preferably 2 mol % or more, more preferably 6 mol % or more, still more preferably 9 mol % or more.

In addition, in order to prevent occurrence of devitrification at the time of manufacturing the glass or performing the bending process, the content of $Li_2O$ is preferably 10 mass % or less, more preferably 9 mass % or less, still more preferably 8 mass % or less. Also, the content of $Li_2O$ is preferably 20 mol % or less, more preferably 17 mol % or less, still more preferably 14 mol % or less.

$K_2O$ is a component enhancing the meltability of the glass and is also a component improving the processability of the glass. The present glass preferably contains $K_2O$. At the time of chemically strengthening the glass for chemical strengthening containing both lithium and potassium by using a sodium-containing salt, chemical strengthening occurs by the ion exchange between lithium ions in the glass and sodium ions in the strengthening salt. In addition, so-called "reverse strengthening" occurs by the ion exchange between potassium ions in the glass and sodium ions in the strengthening salt. A preferable stress profile can be formed owing to occurrence of strengthening and reverse strengthening. In order to facilitate such stress adjustment, the content of $K_2O$ is preferably 2 mass % or more, more preferably 5 mass % or more. Also, the content of $K_2O$ is preferably 1.5 mol % or more, more preferably 2 mol % or more, still more preferably 3 mol % or more.

If the content of $K_2O$ is too large, there is a concern that a tensile stress is generated by the ion exchange treatment and cracking occurs. In order to prevent cracking, the content of $K_2O$ is preferably 10 mass % or less, more preferably 8 mass % or less, still more preferably 6 mass % or less. Also, the content is preferably 8 mol % or less, more preferably 6 mol % or less, still more preferably 5 mol % or less.

In the case of containing $K_2O$, in order to form a special stress profile at the time of strengthening using a sodium-containing salt, the molar ratio $[Li_2O]/[K_2O]$ of $Li_2O$ and $K_2O$ is preferably 10 or less, more preferably 8 or less. On the other hand, if $[Li_2O]/[K_2O]$ is too large, a tensile stress is generated in a region of 10 μm or less during chemical strengthening with sodium ions, leading to occurrence of cracking. Therefore, the ratio is preferably 1 or more, more preferably 2 or more.

$Na_2O$ is not essential but may be contained so as to enhance the meltability of the glass. $Na_2O$ is a component forming a surface compressive stress layer by ion exchange utilizing a molten salt containing potassium and is also a component enhancing the meltability of the glass. In the case of containing $Na_2O$, the content thereof is preferably 0.5 mass % or more, more preferably 1 mass % or more, still more preferably 1.5 mass % or more. Also, the content of $Na_2O$ is preferably 0.5 mol % or more.

In view of stability of the glass, the content of $Na_2O$ is preferably 10 mass % or less, more preferably 8 mass % or less, still more preferably 6 mass % or less.

In order to reduce the surface resistivity of the glass, the content of $Na_2O$ is preferably 4 mass % or less, more preferably 2 mass % or less. Also, the content of $Na_2O$ is preferably 4 mol % or less, more preferably 2 mol % or less, still more preferably 1 mol % or less, and it is particularly preferable to contain substantially no $Na_2O$.

Alkali metal oxides such as $Li_2O$, $Na_2O$ and $K_2O$ (hereinafter, sometimes denoted as $R_2O$) all are components lowering the melting temperature of the glass, and it is preferable to contain 5 mass % or more in total of these. The total ($Li_2O+Na_2O+K_2O$) of the contents of $Li_2O$, $Na_2O$, and $K_2O$ is preferably 5 mass % or more, more preferably 7 mass % or more, still more preferably 8 mass % or more.

Also, the total of the contents is preferably 4 mol % or more, more preferably 6 mol % or more, still more preferably 8 mol % or more.

In order to maintain the strength of the glass, the total of the contents of $Li_2O$, $Na_2O$, and $K_2O$ is preferably 20 mass % or less, more preferably 18 mass % or less.

Also, the total of the contents is preferably 20 mol % or less, more preferably 18 mol % or less.

The molar ratio $[Li_2O]/([Li_2O]+[Na_2O]+[K_2O])$ of $Li_2O$ to the total of $Li_2O$, $Na_2O$ and $K_2O$ is preferably 0.5 or more, because a high compressive stress can be provided in the glass at the time of chemical strengthening. The molar ratio is more preferably 0.6 or more.

In the present glass, the entropy function S value determined according to the following formula is preferably 0.35 or less so as to prevent an electrostatic charge.

$$S = -P_{Li} \times \log(P_{Li}) - P_{Na} \times \log(P_{Na}) - P_K \times \log(P_K)$$

where $$P_{Li} = [Li_2O]/([Li_2O]+[Na_2O]+[K_2O]),$$

$$P_{Na} = [Na_2O]/([Li_2O]+[Na_2O]+[K_2O]), \text{ and}$$

$$P_K = [K_2O]/([Li_2O]+[Na_2O]+[K_2O])$$

Here, $[Li_2O]$, $[Na_2O]$, and $[K_2O]$ represent the contents, in mol %, of $Li_2O$, $Na_2O$, and $K_2O$, respectively.

The entropy function S value is more preferably 0.30 or less, still more preferably 0.28 or less, particularly preferably 0.27 or less.

The present inventors think about this as follows. The charge characteristics of the glass are dependent on the surface resistivity of the glass, in other words, the electrical conductivity of the glass surface. The surface resistivity of the glass depends on the type and amount of alkali components existing in the glass surface. Consequently, a glass having a small entropy function S value is less apt to have electrostatic charge.

The surface resistivity of the glass as measured by the later-described method is preferably $10^{13.5}\Omega$ or less, more preferably $10^{13}\Omega$ or less, still more preferably $10^{12.5}\Omega$ or less.

Alkaline earth metal oxides such as MgO, CaO, SrO, BaO and ZnO all are components enhancing the meltability of the glass but tend to decrease the ion exchange performance.

The total of the contents of MgO, CaO, SrO, BaO, and ZnO is preferably 15 mass % or less, more preferably 10 mass % or less, still more preferably 5 mass % or less.

Also, the total of the contents is preferably 15 mol % or less, more preferably 10 mol % or less, still more preferably 5 mol % or less.

In the case of containing any of MgO, CaO, SrO, BaO and ZnO, it is preferable to contain MgO for increasing the strength of the chemically strengthened glass.

In the case of containing MgO, the content thereof is preferably 0.1 mass % or more, more preferably 0.5 mass % or more. Also, the content of MgO is preferably 0.5 mol % or more, more preferably 1 mol % or more, still more preferably 3 mol % or more. In order to enhance the ion exchange performance, the content of MgO is preferably 10 mass % or less, more preferably 8 mass % or less. Also, the content of MgO is preferably 12 mol % or less, more preferably 9 mol % or less, still more preferably 7 mol % or less, particularly preferably 5 mol % or less.

In the case of containing CaO, the content thereof is preferably 0.5 mass % or more, more preferably 1 mass % or more. Also, the content of CaO is preferably 0.2 mol % or more, more preferably 0.5 mol % or more. On the other hand, in order to enhance the ion exchange performance, the content of CaO is preferably 5 mass % or less, more preferably 3 mass % or less. Also, the content of CaO is preferably 5 mol % or less, more preferably 3 mol % or less, still more preferably 1 mol % or less, particularly preferably 0.5 mol % or less.

In the case of containing SrO, the content thereof is preferably 0.5 mass % or more, more preferably 1 mass % or more. Also, the content of SrO is preferably 0.1 mol % or more, more preferably 0.2 mol % or more. On the other hand, in order to enhance the ion exchange performance, the content of SrO is preferably 5 mass % or less, more preferably 3 mass % or less. Also, the content of SrO is preferably 3 mol % or less, more preferably 1 mol % or less, still more preferably 0.5 mol % or less.

In the case of containing BaO, the content thereof is preferably 0.5 mass % or more, more preferably 1 mass % or more. Also, the content of BaO is preferably 0.1 mol % or more, more preferably 0.2 mol % or more. On the other hand, in order to enhance the ion exchange performance, the content of BaO is preferably 5 mass % or less, more preferably 3 mass % or less. Also, the content of BaO is preferably 3 mol % or less, more preferably 1 mol % or less, still more preferably 0.5 mol % or less.

ZnO is a component enhancing the meltability of the glass and may be contained. In the case of containing ZnO, the content thereof is preferably 0.2 mass % or more, more preferably 0.5 mass % or more. Also, the content of ZnO is preferably 0.1 mol % or more, more preferably 0.2 mol % or more. On the other hand, in order to enhance the ion exchange performance, the content of ZnO is preferably 5 mass % or less, more preferably 3 mass % or less. Also, the content of ZnO is preferably 3 mol % or less, more preferably 1 mol % or less, still more preferably 0.5 mol % or less.

$TiO_2$ is a component preventing scattering of fragments when the chemically strengthened glass is broken, and may be contained. In the case of containing $TiO_2$, the content thereof is preferably 0.1 mass % or more. Also, the content of $TiO_2$ is preferably 0.1 mol % or more, more preferably 0.5 mol % or more. In order to suppress devitrification at the time of melting, the content of $TiO_2$ is preferably 5 mass % or less, more preferably 1 mass % or less. Also, the content of $TiO_2$ is preferably 1 mol % or less, more preferably 0.3 mol % or less. Since $TiO_2$ may cause coloring, for increasing the transparency of the glass, it is still more preferable to contain substantially no $TiO_2$.

$ZrO_2$ is a component increasing the surface compressive stress through ion exchange and may be contained. In the case of containing $ZrO_2$, the content thereof is preferably 0.5 mass % or more, more preferably 1 mass % or more. Also, the content of $ZrO_2$ is preferably 0.2 mol % or more, more preferably 1 mol % or more. In order to prevent devitrification at the time of melting, the content of $ZrO_2$ is preferably 5 mass % or less, more preferably 3 mass % or less. Also, the content of $ZrO_2$ is preferably 3 mol % or less, more preferably 1.2 mol % or less.

It is preferable to contain at least either one of $TiO_2$ and $ZrO_2$. The total content thereof is preferably 1 mass % or more, more preferably 2 mass % or more. Also, the total content thereof is preferably 0.1 mol % or more, more preferably 0.5 mol % or more, still more preferably 1 mol % or more. In order to prevent devitrification at the time of melting, the total content thereof is preferably 5 mass % or less, more preferably 3 mass % or less. Also, the total content thereof is preferably 5 mol % or less, more preferably 3 mol % or less, still more preferably 2 mol % or less.

$Y_2O_3$, $La_2O_3$ and $Nb_2O_5$ are components suppressing crushing of the chemically strengthened glass and may be contained. In the case of containing these components, each content is preferably 0.5 mass % or more, more preferably 1 mass % or more, still more preferably 1.5 mass % or more, particularly preferably 2 mass % or more. Also, the content is 0.5 mol % or more, more preferably 1 mol % or more.

In order to make the glass resistant to devitrification at the time of melting and thereby prevent the reduction in the quality of the chemically strengthened glass, in the case of containing $Y_2O_3$, $La_2O_3$ and $Nb_2O_5$, the content thereof is, in total, preferably 20 mass % or less, more preferably 12 mass % or less, still more preferably 9 mass % or less, yet still more preferably 8 mass % or less. Also, the content thereof is, in total, preferably 7 mol % or less, more preferably 5 mol % or less, still more preferably 2 mol % or less. In addition, the content of each of $Y_2O_3$, $La_2O_3$ and $Nb_2O_5$ is preferably 7 mass % or less, more preferably 5 mass % or less, still more preferably 3 mass % or less. Also, the content of each is more preferably 3 mol % or less.

$Ta_2O_5$ and $Gd_2O_3$ may be contained in a small amount so as to suppress crushing of the chemically strengthened glass, but since the refractive index or reflectance increases, the content of each is preferably 1 mass % or less, more preferably 0.5 mass % or less, and it is still more preferable to contain substantially no $Ta_2O_5$ and $Gd_2O_3$.

$B_2O_3$ may be added so as to, for example, enhance the meltability during glass production. In order to decrease the slope of a stress profile near the surface of the chemically strengthened glass, the content of $B_2O_3$ is preferably 0.5 mass % or more, more preferably 1 mass % or more, still more preferably 2 mass % or more. Also, the content of $B_2O_3$ is preferably 0.5 mol % or more, more preferably 1 mol % or more.

$B_2O_3$ is a component allowing stress relaxation to readily occur after chemical strengthening and therefore, in order to prevent reduction in the surface compressive stress due to stress relaxation, the content of $B_2O_3$ is preferably 10 mass % or less, more preferably 8 mass % or less, still more preferably 5 mass % or less, and most preferably 3 mass % or less. Also, the content of $B_2O_3$ is preferably 10 mol % or less, more preferably 5 mol % or less, still more preferably 2 mol % or less, particularly preferably 1 mol % or less.

$P_2O_5$ may be contained so as to enhance the ion exchange performance. In the case of containing $P_2O_5$, the content thereof is preferably 0.5 mass % or more, more preferably 1 mass % or more. Also, the content of $P_2O_5$ is preferably 0.2 mol % or more, more preferably 0.5 mol % or more. In order to increase the chemical durability, the content of $P_2O_5$ is preferably 10 mass % or less, more preferably 5 mass % or less, still more preferably 3 mass % or less. Also, the content of $P_2O_5$ is preferably 10 mol % or less, more preferably 4 mol % or less, still more preferably 2 mol % or less, particularly preferably 1 mol % or less.

In the case of coloring the glass, a coloring component may be added to the extent not impeding the attainment of desired chemical strengthening characteristics. Examples of the coloring component include $Co_3O_4$, $MnO_2$, $Fe_2O_3$, $NiO$, $CuO$, $Cr_2O_3$, $V_2O_5$, $Bi_2O_3$, $SeO_2$, $CeO_2$, $Er_2O_3$, and $Nd_2O_3$. One of these may be used alone, or some of them may be used in combination.

The content of the coloring component is preferably 7 mass % or less in total. Within this range, the devitrification of the glass can be prevented. The content of the coloring component is more preferably 5 mass % or less, still more preferably 3 mass % or less, particularly preferably 1 mass % or less. Also, the content of the coloring component is, in total, preferably 5 mol % or less, more preferably 3 mol % or less, still more preferably 1 mol % or less. In the case of intending to increase the visible light transmittance of the glass, it is preferable to contain substantially no these components.

In addition, $SO_3$, chlorides, fluorides, etc. may be appropriately contained as a refining agent at the time of melting of the glass. It is preferable to contain substantially no $As_2O_3$. In the case of containing $Sb_2O_3$, the content thereof is preferably 0.3 mass % or less, more preferably 0.1 mass % or less, and it is most preferable to contain substantially no $Sb_2O_3$.

The glass transition temperature (Tg) of the present glass for strengthening is preferably 480° C. or more so as to suppress stress relaxation during chemical strengthening. For the reason that a large compressive stress is obtained by suppressing the stress relaxation, Tg is more preferably 500° C. or more, still more preferably 520° C. or more.

In addition, Tg is preferably 700° C. or less, because the ion diffusion rate increases during chemical strengthening. Since a deep DOL is readily obtained, Tg is more preferably 650° C. or less, still more preferably 600° C. or less.

The Young's modulus of the present glass for strengthening is preferably 70 GPa or more. There is a tendency that as the Young's modulus is higher, fragments are less likely scattered when the strengthened glass is broken. Therefore, the Young's modulus is more preferably 75 GPa or more, still more preferably 80 GPa or more. On the other hand, if the Young's modulus is too high, there is a tendency that ions diffuse slowly at the time of chemical strengthening and a deep DOL can hardly be obtained. Accordingly, the Young's modulus is preferably 110 GPa or less, more preferably 100 GPa or less, still more preferably 90 GPa or less.

The Vickers hardness of the present glass for strengthening is preferably 575 or more. As the Vickers hardness of the glass for chemical strengthening is larger, the Vickers hardness after the chemical strengthening tends to be larger, and the chemically strengthened glass is less likely to get scratched upon falling. Accordingly, the Vickers hardness of the glass for chemical strengthening is more preferably 600 or more, still more preferably 625 or more.

Incidentally, the Vickers hardness after chemical strengthening is preferably 600 or more, more preferably 625 or more, still more preferably 650 or more.

A larger Vickers hardness is advantageous in that the glass is less likely to get scratched, but the Vickers hardness of the present glass for strengthening is usually 850 or less. In a glass in which the Vickers hardness is too high, sufficient ion exchange property tends to be hardly obtained. Therefore, the Vickers hardness is preferably 800 or less, more preferably 750 or less.

The fracture toughness value of the present glass for strengthening is preferably 0.7 MPa·m$^{1/2}$ or more. As the fracture toughness value is larger, scattering of fragments upon breakage of the chemically strengthened glass tends to be more suppressed. The fracture toughness value is more preferably 0.75 MPa·m$^{1/2}$ or more, still more preferably 0.8 MPa·m$^{1/2}$ or more. The fracture toughness value is usually 1 MPa·m$^{1/2}$ or less.

The average thermal expansion coefficient ($\alpha$) at 50° C. to 350° C. of the present glass for strengthening is preferably 100×10$^{-7}$/° C. or less. When the average thermal expansion coefficient ($\alpha$) is small, the glass is less likely to warp at the time of forming of the glass or during cooling after chemical strengthening. The average thermal expansion coefficient ($\alpha$) is more preferably 95×10$^{-7}$/° C. or less, still more preferably 90×10$^{-7}$/° C. or less. In order to suppress the warpage of the chemically strengthened glass, the smaller the average thermal expansion coefficient ($\alpha$), the more preferable it is. But the average thermal expansion coefficient ($\alpha$) is usually 60×10$^{-7}$/° C. or more.

In the present glass for strengthening, the temperature ($T_2$) at which the viscosity becomes 10$^2$ dPa·s is preferably 1,750° C. or less, more preferably 1,700° C. or less, still more preferably 1,680° C. or less. $T_2$ is usually 1,400° C. or more.

In the present glass for strengthening, the temperature ($T_4$) at which the viscosity becomes 10$^4$ dPa·s is preferably 1,350° C. or less, more preferably 1,300° C. or less, still more preferably 1,250° C. or less. $T_4$ is usually 1,000° C. or more.

Examples

The present invention is described below by referring to Examples, but the present invention is not limited thereto.

Glass raw materials were prepared to provide a glass composition shown in molar percentage on an oxide basis in Tables 1A to 1C and weighed to prepare 400 g of a glass. Subsequently, the mixed raw materials were put in a platinum crucible, put into an electric furnace at 1,500 to 1,700° C. to be melted for about 3 hours, then defoamed, and homogenized.

In Tables 2A to 2C, these glass compositions are shown in mass %. The results of measuring the surface resistivity of Glasses 1 to 20 are shown in Tables 2A to 2C. Incidentally, in the Tables, the surface resistivity is shown in a logarithmic scale, and, for example, with respect to Glass 10, the logarithm of the surface resistivity being 13.3 indicates that the surface resistivity was 10$^{13.3}$Ω.

TABLE 1A

| (mol %) | Glass 1 | Glass 2 | Glass 3 | Glass 4 | Glass 5 | Glass 6 | Glass 7 |
|---|---|---|---|---|---|---|---|
| SiO$_2$ | 63.0 | 63.0 | 63.0 | 63.0 | 63.0 | 68.0 | 61.0 |
| Al$_2$O$_3$ | 12.0 | 12.0 | 12.0 | 12.0 | 12.0 | 12.0 | 14.0 |
| Li$_2$O | 11.0 | 11.0 | 11.0 | 11.0 | 11.0 | 11.0 | 13.0 |
| Na$_2$O | 2.8 | 3.8 | 4.8 | 5.8 | 1.8 | 2.8 | 1.8 |
| K$_2$O | 4.1 | 3.1 | 2.1 | 1.1 | 5.1 | 4.1 | 8.1 |
| ZrO$_2$ | 1.0 | 1.0 | 1.0 | 1.0 | 1.0 | 1.0 | 1.0 |
| MgO | 5.9 | 5.9 | 5.9 | 5.9 | 5.9 | 0.9 | 0.9 |
| CaO | 0.2 | 0.2 | 0.2 | 0.2 | 0.2 | 0.2 | 0.2 |
| TiO$_2$ | 0.1 | 0.1 | 0.1 | 0.1 | 0.1 | 0.1 | 0.1 |
| Y$_2$O$_3$ | 0.0 | 0.0 | 0.0 | 0.0 | 0.0 | 0.0 | 0.0 |
| Li$_2$O + Na$_2$O + K$_2$O | 17.9 | 17.9 | 17.9 | 17.9 | 17.9 | 17.9 | 22.9 |
| Li$_2$O/R$_2$O Ratio | 0.61 | 0.61 | 0.61 | 0.61 | 0.61 | 0.61 | 0.57 |
| Li$_2$O/K$_2$O Ratio | 2.68 | 3.55 | 5.24 | 10.00 | 2.16 | 2.68 | 1.60 |
| Entropy function | 0.403 | 0.405 | 0.392 | 0.363 | 0.386 | 0.403 | 0.386 |
| Logarithm of surface resistivity [Ω] | 14.8 | 14.7 | 14.4 | 14.0 | 14.9 | 14.3 | 15.2 |

TABLE 1B

| (mol %) | Glass 8 | Glass 9 | Glass 10 | Glass 11 | Glass 12 | Glass 13 | Glass 14 |
|---|---|---|---|---|---|---|---|
| SiO$_2$ | 61.0 | 70.0 | 63.0 | 67.0 | 58.0 | 68.0 | 67.4 |
| Al$_2$O$_3$ | 14.0 | 7.5 | 12.0 | 8.0 | 15.0 | 10.0 | 10.8 |
| Li$_2$O | 9.0 | 8.0 | 12.0 | 8.0 | 15.0 | 10.0 | 9.9 |
| Na$_2$O | 1.8 | 5.3 | 0.0 | 0.0 | 0.0 | 0.0 | 0.0 |
| K$_2$O | 12.1 | 1.0 | 6.0 | 5.0 | 2.0 | 4.0 | 4.0 |
| ZrO$_2$ | 1.0 | 1.0 | 1.0 | 1.0 | 1.0 | 1.0 | 1.0 |
| MgO | 0.9 | 7.0 | 6.0 | 8.0 | 3.0 | 6.0 | 5.9 |
| CaO | 0.2 | 0.2 | 0.0 | 0.0 | 1.0 | 0.0 | 0.0 |
| TiO$_2$ | 0.1 | 0.1 | 0.0 | 0.0 | 0.0 | 0.0 | 0.0 |

TABLE 1B-continued

| (mol %) | Glass 8 | Glass 9 | Glass 10 | Glass 11 | Glass 12 | Glass 13 | Glass 14 |
|---|---|---|---|---|---|---|---|
| $Y_2O_3$ | 0.0 | 0.0 | 0.0 | 3.0 | 5.0 | 1.0 | 1.0 |
| $Li_2O + Na_2O + K_2O$ | 22.9 | 14.3 | 18.0 | 13.0 | 17.0 | 14.0 | 13.9 |
| $Li_2O/R_2O$ Ratio | 0.39 | 0.56 | 0.7 | 0.6 | 0.9 | 0.7 | 0.7 |
| $Li_2O/K_2O$ Ratio | 0.74 | 8.00 | 2.00 | 1.60 | 7.50 | 2.50 | 2.50 |
| Entropy function | 0.39 | 0.382 | 0.276 | 0.289 | 0.157 | 0.260 | 0.260 |
| Logarithm of surface resistivity [Ω] | 15.70 | 14.0 | 13.3 | 13.0 | 12.0 | 12.6 | 12.6 |

TABLE 1C

| (mol %) | Glass 15 | Glass 16 | Glass 17 | Glass 18 | Glass 19 | Glass 20 |
|---|---|---|---|---|---|---|
| $SiO_2$ | 64.5 | 68.7 | 68.7 | 68.7 | 68.7 | 69.0 |
| $Al_2O_3$ | 9.8 | 12.2 | 14.4 | 13.1 | 12.0 | 10.0 |
| $Li_2O$ | 9.8 | 11.0 | 11.0 | 11.0 | 11.0 | 10.0 |
| $Na_2O$ | 0.0 | 0.0 | 0.0 | 0.0 | 0.0 | 0.0 |
| $K_2O$ | 2.9 | 4.0 | 4.0 | 4.0 | 4.0 | 10.0 |
| $ZrO_2$ | 1.0 | 0.8 | 0.8 | 1.4 | 1.6 | 1.0 |
| MgO | 7.8 | 0.0 | 0.0 | 0.0 | 0.0 | 0.0 |
| CaO | 0.0 | 0.2 | 0.2 | 0.2 | 0.2 | 0.0 |
| $TiO_2$ | 0.0 | 0.0 | 0.0 | 0.0 | 0.0 | 0.0 |
| $Y_2O_3$ | 2.0 | 3.0 | 0.8 | 1.4 | 2.4 | 0.0 |
| $Li_2O + Na_2O + K_2O$ | 12.7 | 15.0 | 15.0 | 15.0 | 15.0 | 20.0 |
| $Li_2O/R_2O$ Ratio | 0.8 | 0.7 | 0.7 | 0.7 | 0.7 | 0.5 |
| $Li_2O/K_2O$ Ratio | 3.33 | 2.75 | 2.75 | 2.75 | 2.75 | 1.00 |
| Entropy function | 0.235 | 0.252 | 0.252 | 0.252 | 0.252 | 0.30 |
| Logarithm of surface resistivity [Ω] | 11.9 | 12.6 | 12.8 | 12.7 | 12.7 | 14.3 |

TABLE 2A

| (wt %) | Glass 1 | Glass 2 | Glass 3 | Glass 4 | Glass 5 | Glass 6 | Glass 7 |
|---|---|---|---|---|---|---|---|
| $SiO_2$ | 60.3 | 60.6 | 60.9 | 61.2 | 60.0 | 64.1 | 56.1 |
| $Al_2O_3$ | 19.5 | 19.6 | 19.7 | 19.8 | 19.4 | 19.2 | 21.8 |
| $Li_2O$ | 5.2 | 5.3 | 5.3 | 5.3 | 5.2 | 5.2 | 5.9 |
| $Na_2O$ | 2.8 | 3.8 | 4.8 | 5.8 | 1.8 | 2.7 | 1.7 |
| $K_2O$ | 6.2 | 4.7 | 3.2 | 1.7 | 7.6 | 6.1 | 11.7 |
| $ZrO_2$ | 2.0 | 2.0 | 2.0 | 2.0 | 2.0 | 1.9 | 1.9 |
| MgO | 3.8 | 3.8 | 3.8 | 3.8 | 3.8 | 0.6 | 0.6 |
| CaO | 0.2 | 0.2 | 0.2 | 0.2 | 0.2 | 0.2 | 0.2 |
| $TiO_2$ | 0.1 | 0.1 | 0.1 | 0.1 | 0.1 | 0.1 | 0.1 |
| $Li_2O + Na_2O + K_2O$ | 14.2 | 13.7 | 13.3 | 12.8 | 14.6 | 13.9 | 19.3 |

TABLE 2B

| (wt %) | Glass 8 | Glass 9 | Glass 10 | Glass 11 | Glass 12 | Glass 13 | Glass 14 |
|---|---|---|---|---|---|---|---|
| $SiO_2$ | 54.0 | 69.4 | 60.1 | 60.3 | 49.2 | 64.1 | 63.2 |
| $Al_2O_3$ | 21.0 | 12.6 | 19.4 | 12.2 | 21.6 | 16.0 | 17.2 |
| $Li_2O$ | 4.0 | 3.9 | 5.7 | 3.6 | 6.3 | 4.7 | 4.6 |
| $Na_2O$ | 1.6 | 5.4 | 0.0 | 0.0 | 0.0 | 0.0 | 0.0 |
| $K_2O$ | 16.8 | 1.6 | 9.0 | 7.1 | 2.7 | 5.9 | 5.9 |
| $ZrO_2$ | 1.8 | 2.0 | 2.0 | 1.8 | 1.7 | 1.9 | 1.9 |
| MgO | 0.5 | 4.7 | 3.8 | 4.8 | 1.7 | 3.8 | 3.7 |
| CaO | 0.2 | 0.2 | 0.0 | 0.0 | 0.8 | 0.0 | 0.0 |
| $TiO_2$ | 0.1 | 0.2 | 0.0 | 0.0 | 0.0 | 0.0 | 0.0 |
| $Y_2O_3$ | 0.0 | 0.0 | 0.0 | 10.1 | 15.9 | 3.5 | 3.5 |
| $Li_2O + Na_2O + K_2O$ | 22.4 | 10.9 | 14.7 | 10.6 | 9.0 | 10.6 | 10.5 |

TABLE 2C

| (wt %) | Glass 15 | Glass 16 | Glass 17 | Glass 18 | Glass 19 | Glass 20 |
|---|---|---|---|---|---|---|
| $SiO_2$ | 60.4 | 60.1 | 62.6 | 61.7 | 60.6 | 63.5 |
| $Al_2O_3$ | 15.6 | 18.0 | 22.3 | 20.0 | 18.0 | 15.6 |
| $Li_2O$ | 4.6 | 4.8 | 5.0 | 4.9 | 4.8 | 4.6 |
| $Na_2O$ | 0.0 | 0.0 | 0.0 | 0.0 | 0.0 | 0.0 |
| $K_2O$ | 4.3 | 5.5 | 5.7 | 5.6 | 5.5 | 14.4 |
| $ZrO_2$ | 1.9 | 1.4 | 1.5 | 2.7 | 2.9 | 1.9 |
| MgO | 6.3 | 0.0 | 0.0 | 0.0 | 0.0 | 0.0 |
| CaO | 0.0 | 0.2 | 0.2 | 0.2 | 0.2 | 0.0 |
| $Y_2O_3$ | 7.0 | 10.0 | 2.7 | 4.9 | 8.0 | 0.0 |
| $Li_2O + Na_2O + K_2O$ | 8.8 | 10.3 | 10.7 | 10.6 | 10.4 | 19.0 |

The molten glass obtained was poured into a metal mold, held at a temperature higher by about 50° C. than the glass transition temperature for 1 hour, and then cooled to room temperature at a rate of 0.5° C./min to obtain a glass block. The glass block obtained was cut and ground, and both surfaces thereof were finally mirror-polished to obtain a glass sheet having a thickness of 600 μm.

The surface resistivity was measured according to the following procedure.

(Washing of Substrate)

A glass sheet (50 mm×50 mm) was washed by subjecting it to washing for 5 minutes with an alkaline detergent in which 4 mass % of sodium metasilicate nonahydrate, 20 mass % of polyoxyethylene alkyl ether and pure water are mixed, then to washing with a neutral detergent for 5 minutes, furthermore, to washing with pure water of room temperature, 50° C. and 65° C. respectively for 5 minutes. The washed glass was then exposed to hot air at 65° C. for 6 minutes to dry the substrate surface.

Figure 5:
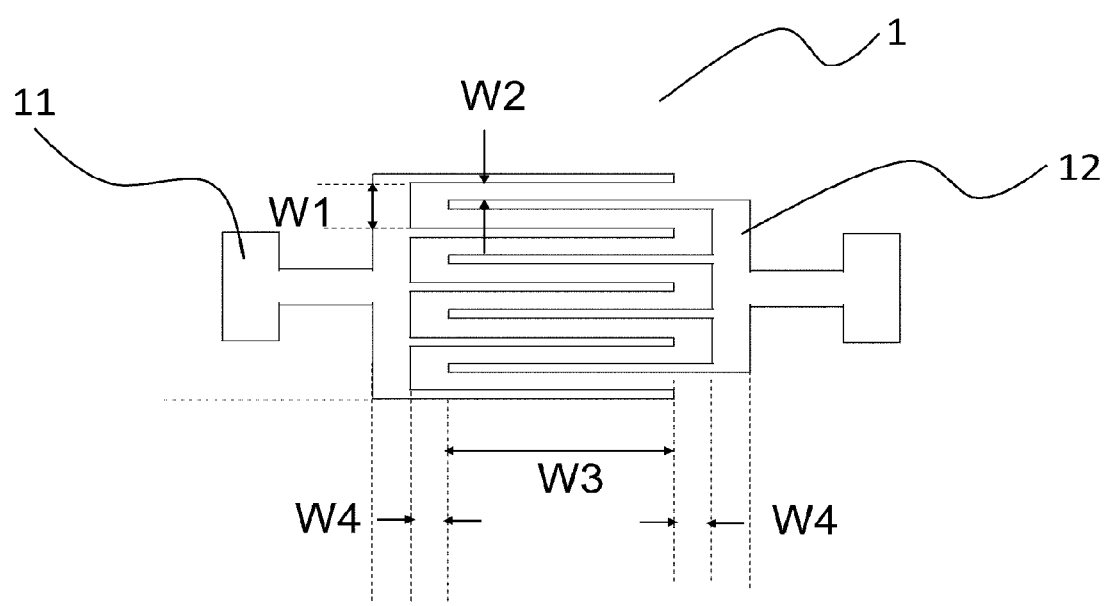
FIG. 5 is a schematic plan view of the electrode pattern for measuring the surface resistivity.
Figure 6:
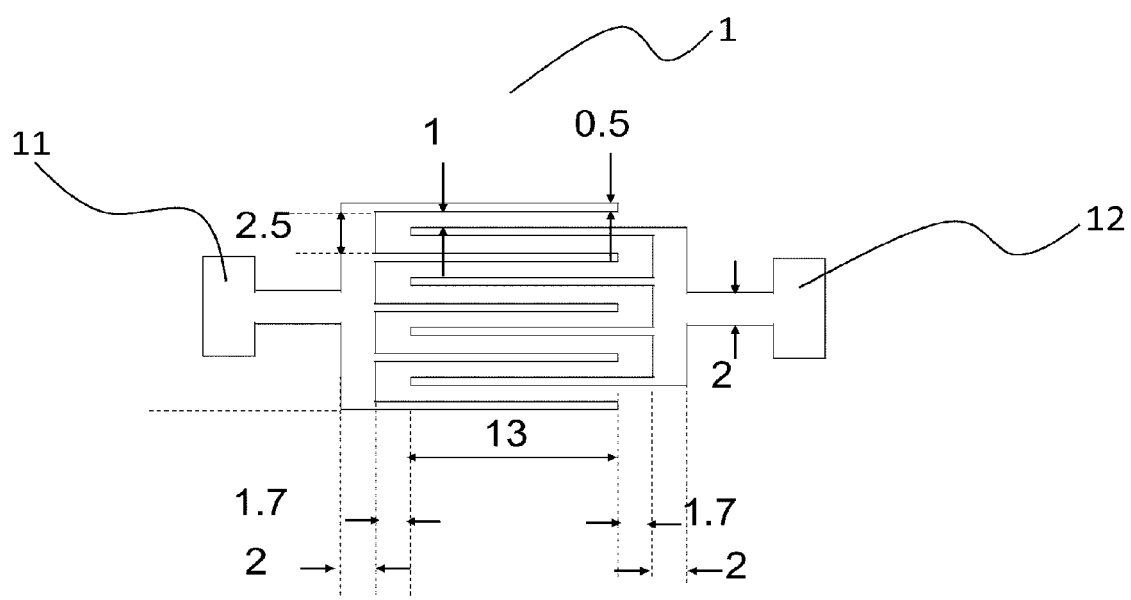
FIG. 6 is a schematic plan view of the electrode pattern used for the measurement of the surface resistivity in Examples.

Next, a Pt film was formed with 30 nm on the surface of the glass substrate in an Ar atmosphere by using a magnetron sputter coater (Q300TT, manufactured by Quorum Techbiologies) to form a comb-type electrode pattern illustrated in FIG. 5 and FIG. 6. In FIG. 5, a comb-type electrode 1 has a configuration where a first comb-type electrode 11 and a second comb-type electrode 12 are disposed to face each other such that the comb teeth are alternately arranged. In FIG. 6, the units of numerical values indicating the length of each width are all mm.

The measurement was conducted using a digital ultrahigh resistance/microammeter (ADVANTEST R830A ULTRA HIGH RESISTANCE METER).

The glass sheet was placed on a copper substrate and after connecting a copper wire to the obtained electrode, heated up to 50° C. and allowed to stand still for 30 minutes until the temperature stabilizes. After the stabilization of the temperature, a voltage of 50 V was applied, allowing 3 minutes to pass until the voltage stabilizes, and the current measurement was started. The current value after 3 minutes was read, and the surface resistivity was calculated as follows.

The surface resistivity ρ was determined according to ρ=R×r using the resistance value R, which is obtained as R=V/I from the current value I measured using the comb-type electrode and the voltage V, and the electrode coefficient r. The electrode coefficient r is calculated from the ratio of the length of an electrode of each side to the length between electrodes. With respect to the comb-type electrode 1 of FIG. 5, the electrode coefficient is calculated according to r=(W3/W2)×8+(W1/W4)×7.

Glasses 1 to 21 were subjected to a two-step strengthening treatment shown in Tables 3A to 3D to prepare the following chemical strengthened glasses of Ex. 1 to Ex. 39. That is, the glass was held in the molten salt shown in the column of Molten salt 1 of Tables 3A to 3D at the temperature shown in the column of Temperature 1 for the time shown in the column of Holding time 1 and then held in the molten salt shown in the column of Molten salt 2 at the temperature shown in the column of Temperature 2 for the time shown in the column of Holding time 2 to obtain a chemically strengthened glass. The K concentration and Na concentration in the column of Molten salt 1 and the column of Molten salt 2 indicate the salt concentration by weight ratio. In Tables 3A to 3D, the symbol "–" indicates unmeasured.

[Stress Profile]

Figure 3:
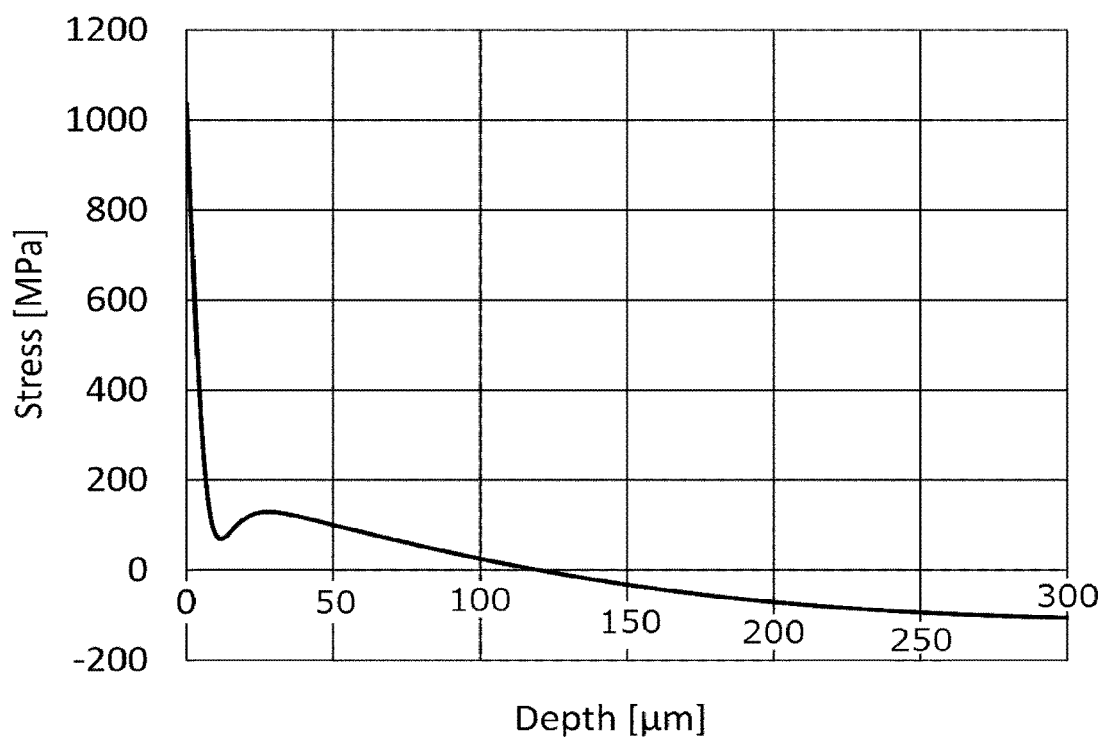
FIG. 3 is a diagram illustrating a stress profile of the chemically strengthened glass.
Figure 4:
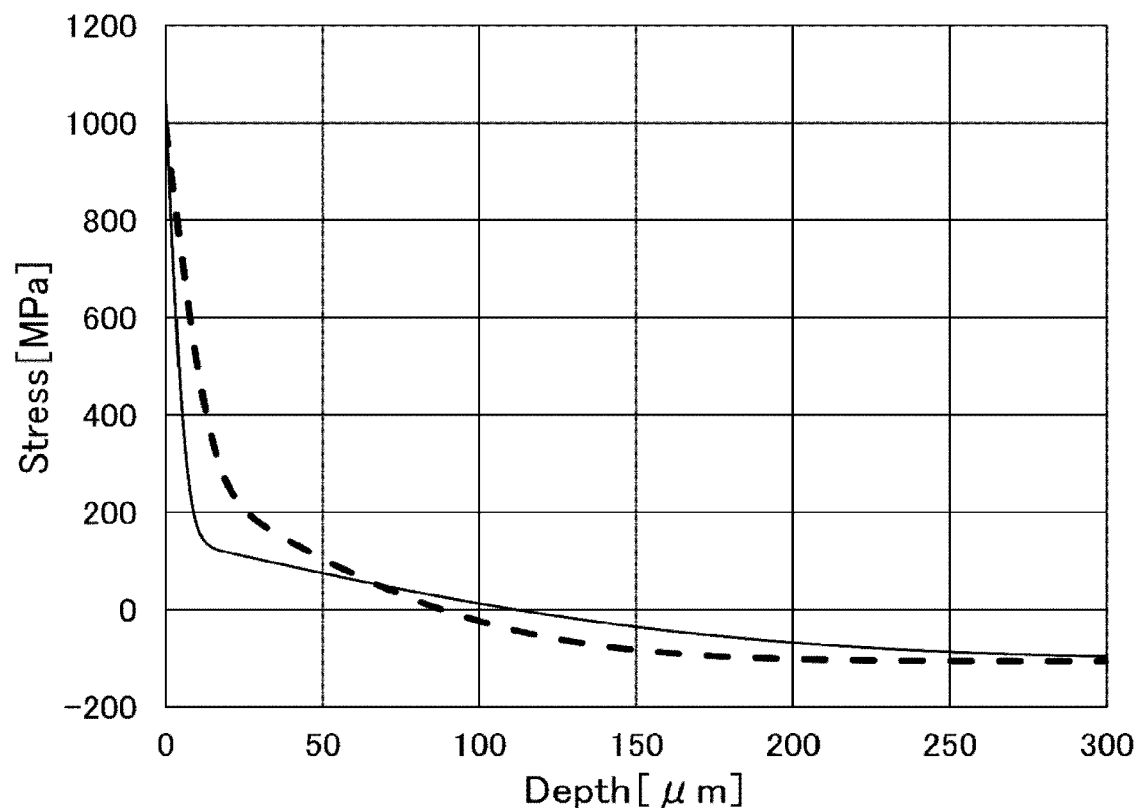
FIG. 4 is a diagram illustrating a stress profile of the chemically strengthened glass.

The stress value was measured using an optical-waveguide surface stress meter, FSM-6000, manufactured by Orihara Manufacturing Co., Ltd. and a birefringence stress meter, Abrio. The results are shown in Tables 3A to 3D. $CS_0$ is a value measured using the optical-waveguide surface stress meter, and $CS_A$, $D_A$, $CS_B$, $D_B$, DOL, and $CS_{50}$ are values measured by the birefringence stress meter. SΔ is a value computable from the stress profile calculated using the optical-waveguide surface stress meter and the birefringence stress meter in combination. FIG. 1 illustrates the stress profile of Ex. 4, FIG. 2 illustrates the stress profile of Ex. 19, and FIG. 3 is the stress profile of Ex. 23. In FIG. 4, the solid line is the stress profile of Ex. 34, and the dotted line is the stress profile of Ex. 36.

[Drop Test]

In the drop test, a simulated smartphone was prepared by fitting the obtained glass sample of 120×60×0.6 mm t into a structure in which the mass and rigidity thereof are adjusted to conform to the general smartphone size currently used, and allowed to freely fall on #180 SiC sandpaper. As for the drop height, when the sample was dropped from a height of 5 cm and not broken, an operation of increasing the height by 5 cm and again dropping the sample was repeated until the glass was broken. The average value of 10 sheets for heights at which the glass was firstly broken is shown in Tables 3A to 3D.

[Crushing Number]

A crushing test where the chemically strengthened glass is processed into a square shape with one side of 30 mm and a diamond indenter having a tip angle of 90° is struck on the obtained glass was performed. When the glass was not broken, the test was repeated while gradually increasing the load applied to the indenter, and the number of fragments at the minimum load at which breakage occur is defined as the crushing number, and is shown in Tables 3A to 3D. When the crushing number exceeds 10, the internal tensile stress CT can be judged to be excessive.

[Surface Cracking]

After the chemical strengthening treatment, the surface state was observed with an optical microscope, and the results are shown in Tables 3A to 3D. When cracks developed on the surface of the glass, this is rated C.

In Tables 3A to 3D, Ex. 1 to Ex. 13 and Ex. 20 to Ex. 30 are Working Examples, and Ex. 14 to Ex. 19 and Ex. 31 to Ex. 38 are Comparative Examples.

TABLE 3A

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| | Glass number | | 1 | 1 | 1 | 2 | 2 | 3 | 3 | 4 | 4 |
| | Sheet thickness t (μm) | | 600 | 600 | 600 | 600 | 600 | 600 | 600 | 600 | 600 |
| Chemical strengthening treatment 1 | Molten salt 1 | K concentration (mass %) | 0 | 0 | 25 | 0 | 25 | 0 | 25 | 0 | 25 |
| | | Na concentration (mass %) | 100 | 100 | 75 | 100 | 75 | 100 | 75 | 100 | 75 |
| | Temperature 1 | (° C.) | 450 | 450 | 450 | 450 | 450 | 450 | 450 | 450 | 450 |
| | Holding time 1 | (hour) | 2.0 | 1.5 | 1.5 | 1.5 | 1.5 | 1.5 | 1.5 | 1.5 | 1.5 |
| Chemical strengthening treatment 2 | Molten salt 2 | K concentration (mass %) | 100 | 100 | 100 | 100 | 100 | 100 | 100 | 100 | 100 |
| | | Na concentration (mass %) | 0 | 0 | 0 | 0 | 0 | 0 | 0 | 0 | 0 |
| | Temperature 2 | (° C.) | 450 | 425 | 425 | 425 | 425 | 425 | 425 | 425 | 425 |
| | Holding time 2 | (hour) | 1.0 | 1.0 | 1.0 | 1.0 | 1.0 | 1.0 | 1.0 | 1.0 | 1.0 |
| Stress profile | t [μm] | | 600 | 600 | 600 | 600 | 600 | 600 | 600 | 600 | 600 |
| | $CS_0$ [MPa] | | 897 | 1278 | 1056 | 1124 | 1146 | 1228 | 1199 | 1371 | 1311 |
| | $CS_A$ [MPa] | | 245 | 216 | 199 | 182 | 220 | 193 | 209 | 194 | 202 |
| | $CS_B$ [MPa] | | 256 | 228 | 223 | 218 | 230 | 221 | 218 | 209 | 209 |
| | $CS_{50}$ [MPa] | | 130 | 105 | 98 | 126 | 121 | 140 | 140 | 153 | 152 |
| | t × 0.1 [μm] | | 60 | 60 | 60 | 60 | 60 | 60 | 60 | 60 | 60 |
| | CT [MPa] | | 80 | 50 | 50 | 64 | 64 | 75 | 78 | 92 | 90 |
| | $D_K$ [μm] | | 10 | 7 | 7 | 6 | 7 | 6 | 6 | 5 | 5 |
| | $D_A$ [μm] | | 10 | 9 | 7 | 6 | 8 | 5 | 7 | 8 | 9 |
| | $D_B$ [μm] | | 11 | 15 | 13 | 17 | 15 | 17 | 15 | 18 | 18 |
| | DOL [μm] | | 92 | 87 | 84 | 100 | 95 | 112 | 110 | 126 | 127 |
| | SΔ [MPa · μm] | | 379 | 3241 | 2655 | 5290 | 3281 | 6281 | 3992 | 5946 | 5020 |

TABLE 3A-continued

|  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
|  | Drop height [cm] |  | 70.2 | 63.6 | 61.8 | 69.1 | 67.8 | 72.7 | 72.7 | 76.2 | 76.1 |
|  | Crushing number |  | 7 | 2 | 2 | 2 | 2 | 3 | 3 | 9 | 9 |
|  | Surface cracking |  | none | none | none | none | none | none | none | none | none |

TABLE 3B

|  |  |  | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|
|  | Glass number |  | 5 | 6 | 6 | 7 | 6 | 6 | 7 | 7 | 8 | 9 |
|  | Sheet thickness t (μm) |  | 600 | 600 | 600 | 600 | 600 | 600 | 600 | 600 | 600 | 600 |
| Chemical strengthening treatment 1 | Molten salt 1 | K concentration (mass %) | 25 | 0 | 0 | 50 | 0 | 25 | 25 | 25 | 0 | 0 |
|  |  | Na concentration (mass %) | 75 | 100 | 100 | 50 | 100 | 75 | 75 | 75 | 100 | 100 |
|  | Temperature 1 | (° C.) | 450 | 450 | 450 | 450 | 450 | 450 | 450 | 450 | 450 | 450 |
|  | Holding time 1 | (hour) | 1.5 | 1.0 | 2.0 | 1.0 | 4.0 | 2.0 | 1.0 | 2.0 | 1.0 | 2.0 |
| Chemical strengthening treatment 2 | Molten salt 2 | K concentration (mass %) | 100 | 100 | 100 | 100 | 100 | 100 | 100 | 100 | 100 | 100 |
|  |  | Na concentration (mass %) | 0 | 0 | 0 | 0 | 0 | 0 | 0 | 0 | 0 | 0 |
|  | Temperature 2 | (° C.) | 425 | 425 | 425 | 425 | 425 | 425 | 425 | 425 | 425 | 425 |
|  | Holding time 2 | (hour) | 1.0 | 1.5 | 1.5 | 1.5 | 1.5 | 1.5 | 1.5 | 1.5 | 1.5 | 1.5 |
| Stress profile | t [μm] |  | 600 | 600 | 600 | 600 | 600 | 600 | 600 | 600 | 600 | 600 |
|  | $CS_0$ [MPa] |  | 1140 | 871 | 813 | 854 | 867 | 827 | 720 | 717 | 600 | 856 |
|  | $CS_A$ [MPa] |  | 198 | 150 | 122 | 138 | 148 | 174 | 262 | 220 |  | 147 |
|  | $CS_B$ [MPa] |  | 216 | 151 | 137 | 140 | 166 | 177 | 262 | 220 |  | 147 |
|  | $CS_{50}$ [MPa] |  | 67 | 30 | 61 | 88 | 139 | 127 | 32 | 76 |  | 70 |
|  | t × 0.1 [μm] |  | 60 | 60 | 60 | 60 | 60 | 60 | 60 | 60 | 60 | 60 |
|  | CT [MPa] |  | 41 | 37 | 45 | 69 | 117 | 94 | 44 | 58 |  | 74 |
|  | $D_K$ [μm] |  | 8 | 8 | 11 | 13 | 11 | 13 | 15 | 10 |  | 7 |
|  | $D_A$ [μm] |  | 9 | 14 | 17 | 21 | 18 | 16 | 10 | 10 |  | 10 |
|  | $D_B$ [μm] |  | 14 | 16 | 27 | 23 | 31 | 25 | 10 | 10 |  | 10 |
|  | DOL [μm] |  | 72 | 92 | 69 | 95 | 117 | 108 | 58 | 69 |  | 113 |
|  | SΔ [MPa · μm] |  | 2436 | 726 | 3588 | 737 | 4834 | 2963 | 0 | 0 |  | 0 |
|  | Drop height [cm] |  | 53.6 | 43.9 | 52.0 | 59.0 | 72.5 | 69.4 | 44.3 | 56.0 |  | 58.0 |
|  | Crushing number |  | 2 | 2 | 2 | 3 | 30 | 15 | 2 | 3 |  | 3 |
|  | Surface cracking |  | none | none | none | none | none | none | none | none | occurred | none |

TABLE 3C

|  |  |  | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|---|
|  | Glass number |  | 10 | 11 | 12 | 13 | 14 | 15 | 15 | 16 | 17 | 18 |
|  | Sheet thickness t (μm) |  | 600 | 600 | 600 | 600 | 600 | 600 | 600 | 600 | 600 | 600 |
| Chemical strengthening treatment 1 | Molten salt 1 | K concentration (mass %) | 0 | 0 | 0 | 0 | 0 | 0 | 0 | 0 | 0 | 0 |
|  |  | Na concentration (mass %) | 100 | 100 | 100 | 100 | 100 | 100 | 100 | 100 | 100 | 100 |
|  | Temperature 1 | (° C.) | 450 | 450 | 450 | 450 | 450 | 450 | 450 | 450 | 450 | 450 |
|  | Holding time 1 | (hour) | 3 | 2 | 2 | 2 | 2 | 2 | 3 | 4 | 2 | 3 |
| Chemical strengthening treatment 2 | Molten salt 2 | K concentration (mass %) | 100 | 100 | 100 | 100 | 100 | 100 | 100 | 100 | 99 | 100 |
|  |  | Na concentration (mass %) | 0 | 0 | 0 | 0 | 0 | 0 | 0 | 0 | 1 | 0 |
|  | Temperature 2 | (° C.) | 425 | 425 | 425 | 425 | 400 | 400 | 450 | 450 | 425 | 425 |
|  | Holding time 2 | (hour) | 1 | 1 | 1 | 1 | 1 | 1 | 1 | 1 | 1 | 1 |
| Stress profile | t [μm] |  | 600 | 600 | 600 | 600 | 600 | 600 | 600 | 600 | 600 | 600 |
|  | $CS_0$ [MPa] |  | 1095 | 942 | 1076 | 1151 | 974 | 1012 | 607 | 869 | 752 | 924 |
|  | $CS_A$ [MPa] |  | 380 | 154 | 322 | 70 | 187.36 | 237 | 145 | 127 | 8 | 151 |
|  | $CS_B$ [MPa] |  | 426 | 159 | 364 | 129 | 203 | 252 | 155 | 157 | 78 | 170 |
|  | $CS_{50}$ [MPa] |  | 138.1 | 86.5 | 220.3 | 100.0 | 136.0 | 143.4 | 103.6 | 118.8 | 73.5 | 117.6 |
|  | t × 0.1 [μm] |  | 60 | 60 | 60 | 60 | 60 | 60 | 60 | 60 | 60 | 60 |
|  | CT [MPa] |  | −105 | −58 | −124 | −101 | −120 | −88 | −91 | −121 | −129 | −76 |
|  | $D_K$ [μm] |  | 6 | 7 | 7 | 9 | 10 | 7 | 10 | 10 | 13 | 8 |
|  | $D_A$ [μm] |  | 7 | 8 | 7 | 12 | 12 | 8 | 12 | 12 | 16 | 9 |
|  | $D_B$ [μm] |  | 18 | 17 | 22 | 28 | 21 | 19 | 20 | 25 | 62 | 24 |
|  | DOL [μm] |  | 68 | 78 | 82 | 119 | 112 | 79 | 113 | 121 | 120 | 87 |
|  | SΔ [MPa · μm] |  | 4092 | 3564 | 5801 | 8999 | 3634 | 4324 | 1909 | 5000 | 17681 | 5884 |
|  | Drop height [cm] |  | 81.9 | 61.2 | 114.7 | 66.6 | 81.0 | 84.0 | 68.0 | 74.1 | 56.0 | 73.7 |
|  | Crushing number |  | 10 | 2 | 10 | 10 | 10 | 5 | 9 | 10 | 10 | 2 |
|  | Surface cracking after strengthening |  | none | none | none | none | none | none | none | none | none | none |

TABLE 3D

|  |  |  | Ex. 30 | Ex. 31 | Ex. 32 | Ex. 33 | Ex. 34 | Ex. 35 | Ex. 36 | Ex. 37 | Ex. 38 |
|---|---|---|---|---|---|---|---|---|---|---|---|
|  | Glass number |  | 19 | 12 | 13 | 13 | 14 | 15 | 15 | 17 | 20 |
|  | Sheet thickness t (μm) |  | 600 | 600 | 600 | 600 | 600 | 600 | 600 | 600 | 600 |
| Chemical strengthening treatment 1 | Molten salt 1 | K concentration (mass %) | 0 | 0 | 0 | 0 | 0 | 50 | 0 | 0 | 0 |
|  |  | Na concentration (mass %) | 100 | 100 | 100 | 100 | 100 | 100 | 100 | 100 | 100 |
|  | Temperature 1 | (° C.) | 450 | 450 | 450 | 450 | 450 | 450 | 450 | 450 | 450 |
|  | Holding time 1 | (hour) | 2 | 3 | 2 | 2 | 3 | 2 | 1 | 1 | 3 |
| Chemical strengthening treatment 2 | Molten salt 2 | K concentration (mass %) | 100 | 100 | 99.5 | 90 | 100 | 100 | 100 | 100 | 100 |
|  |  | Na concentration (mass %) | 0 | 0 | 0.5 | 10 | 0 | 0 | 0 | 0 | 0 |
|  | Temperature 2 | (° C.) | 425 | 425 | 425 | 425 | 450 | 425 | 450 | 450 | 450 |
|  | Holding time 2 | (hour) | 1 | 2 | 1 | 1 | 1 | 1.5 | 3 | 2 | 1 |
| Stress profile | t [μm] |  | 600 | 600 | 600 | 600 | 600 | 600 | 600 | 600 | 600 |
|  | $CS_0$ [MPa] |  | 1110 | 1036 | 780 | 867 | 620 | 1046 | 910 | 994 | — |
|  | $CS_A$ [MPa] |  | 371 | 317 | 47 | 106 | 190 | — | — | — | — |
|  | $CS_B$ [MPa] |  | 398 | 402 | 127 | 135 | 228 | — | — | — | — |
|  | $CS_{50}$ [MPa] |  | 94.9 | 296.4 | 123.6 | 135.7 | 177.5 | 73.6 | 65.4 | 101.4 | — |
|  | t × 0.1 [μm] |  | 60 | 60 | 60 | 60 | 60 | 60 | 60 | 60 | 60 |
|  | CT [MPa] |  | −90 | −164 | −193 | −206 | −166 | −97 | −90 | −106 | — |
|  | $D_K$ [μm] |  | 6 | 7 | 15 | 16 | 13 | 8 | 12 | — | — |
|  | $D_A$ [μm] |  | 7 | 8 | 15 | 16 | 13 | — | — | — | — |
|  | $D_B$ [μm] |  | 16 | 27 | 55 | 47 | 27 | — | — | — | — |
|  | DOL [μm] |  | 63 | 91 | 120 | 123 | 125 | 111 | 81 | 88 | — |
|  | SΔ [MPa · μm] |  | 3419 | 7168 | 15251 | 12025 | 3257 | 0 | 0 | 0 | 0 |
|  | Drop height [cm] |  | 64.6 | 145.1 | 76.0 | 80.9 | 97.6 | 56.0 | 52.8 | 67.2 | — |
|  | Crushing number |  | 7 | 40 | 20 | 20 | 20 | 8 | 7 | 9 | — |
|  | Surface cracking after strengthening |  | none | none | none | none | none | none | none | none | occurred |

In Ex. 16 and Ex. 17 where $CS_0$ was insufficient, the drop strength was low.

In Ex. 18 where Glass 8 containing a large amount of $K_2O$ was chemically strengthened, cracks were generated in the sample after the first chemical strengthening, and the drop strength was also low. In addition, since the glass was broken during processing for stress measurement, the stress measurement by a birefringence stress meter could not be performed.

Ex. 16, Ex. 17 and Ex. 19 are Comparative Examples where as the depth increases, CS becomes smaller over the entire range from the glass surface to DOL. Point A and point B coincided, and the drop strength was low.

In Ex. 14 and Ex. 15, the strength was high, but CT was large and in turn, the crushing number was large.

In all of Ex. 20 to Ex. 31 which are Examples of Na-free glass, excellent drop strength was exhibited. On the other hand, in Ex. 35, the sodium concentration of the sodium-containing salt of the first-step was low and as indicated by the solid line in FIG. 4, a stress profile in which the stress value becomes smaller as the depth from the glass surface increases is presented. In Ex. 36 where the compressive stress inside the glass was low, the drop strength was low.

Ex. 35 and Ex. 36 are examples where the second-step chemical strengthening time is longer than the first-step chemical strengthening time. As indicated by the dotted line in FIG. 4, Ex. 36 presents a stress profile in which the stress value becomes smaller as the depth from the glass surface increases, and since the compressive stress inside the glass was low, the drop strength was low.

In Ex. 31 to Ex. 33, the strength was high but CT was large, and the crushing number was large.

In Ex. 38 using Glass 20 containing a large amount of $K_2O$, cracks were generated by the first treatment, and the drop strength was also low. In Ex. 38 using Glass 21 having a small $K_2O$ content, a stress profile in which as the depth increases, the compressive stress value becomes smaller over the entire range from the glass surface to DOL is presented, and since the compressive stress inside the glass was low, the drop strength was low.

While the present invention has been described in detail and with reference to specific embodiments thereof, it will be apparent to one skilled in the art that various changes and modifications can be made therein without departing from the spirit and scope of the present invention. This application is based on Japanese Patent Application (Patent Application No. 2019-007184) filed on Jan. 18, 2019 and Japanese Patent Application (Patent Application No. 2019-142999) filed on Aug. 2, 2019, the entirety of which is incorporated herein by way of reference. Also, all the references cited herein are incorporated herein in their entirety.

REFERENCE SIGNS LIST

1 Comb-type electrode
11 First comb-type electrode
12 Second comb-type electrode

The invention claimed is:

1. A chemically strengthened glass, comprising:
   a glass having a surface and a compressive stress layer formed on the surface,
   wherein the glass has a compressive stress value ($CS_0$) on the surface of 800 MPa or more, the glass has a sheet thickness (t) of 100 μm or more, the glass, before being chemically strengthened, has a surface resistivity of $10^{13.5}\Omega$ or less, the compressive stress layer has a depth (DOL) of (t×0.14) μm or more, and $CS_B > CS_A > 0$, where $D_B$ is a depth of a maximum compressive stress value, the depth being in a range of 10 μm or more and not more than DOL from the surface; $CS_B$ is the compressive stress value at the depth $D_B$; $D_A$ is a depth of a minimum compressive stress value, the depth being in a range of equal to or less than $D_B$ from the surface of the glass; and $CS_A$ is the compressive stress value at the depth $D_A$.

2. The chemically strengthened glass according to claim 1, wherein the glass has a number of fragments generated of 10 or less, in a case where the glass is processed into a square shape with one side of 30 mm and a diamond indenter having a tip angle of 90° is struck thereon with a minimum load at which breakage occur.

3. The chemically strengthened glass according to claim 1, the glass has a compressive stress value $CS_{50}$ at a depth of 50 μm from the surface of (t×0.1) MPa or more.

4. The chemically strengthened glass according to claim 1, wherein the sheet thickness (t) is 2,000 μm or less.

5. The chemically strengthened glass according to claim 1, wherein the glass is a lithium aluminosilicate glass.

6. The chemically strengthened glass according to claim 5, wherein the glass has a glass composition at a central portion in a thickness direction comprising, in mass %, 50% or more of $SiO_2$ and 5% or more of $Al_2O_3$, a total content of $Li_2O$, $Na_2O$ and $K_2O$ of 5% or more, and a molar ratio $[Li_2O]/([Li_2O]+[Na_2O]+[K_2O])$ of a content of $Li_2O$ to the total content of $Li_2O$, $Na_2O$ and $K_2O$ of 0.5 or more.

7. The chemically strengthened glass according to claim 5, wherein the glass has a base composition comprising, in mass % on an oxide basis: from 50 to 80% of $SiO_2$; from 5 to 25% of $Al_2O_3$; from 2 to 20% of $Li_2O$; from 1.5 to 10% of $Na_2O$; from 1 to 12% of $K_2O$; from 0 to 10% of $B_2O_3$; from 0 to 10% of $P_2O_5$; from 10% or less, in total, of at least one selected from the group consisting of MgO, ZnO, CaO, SrO, and BaO; and 5% or less, in total, of at least one selected from the group consisting of $ZrO_2$ and $TiO_2$.

8. The chemically strengthened glass according to claim 5, wherein the glass has a base composition comprising, in mol % on an oxide basis: from 58 to 70% of $SiO_2$; from 7 to 20% of $Al_2O_3$; from 2 to 20% of $Li_2O$; from 0 to 2% of $Na_2O$); from 2 to 6% of $K_2O$; from 0 to 2% of $B_2O_3$; from 0 to 2% of $P_2O_5$; from 0.1 to 3% of either one or more kinds of $ZrO_2$ and $TiO_2$ in total; and from 0 to 15%, in total, of at least one selected from the group consisting of MgO, ZnO, CaO, SrO, and BaO.

9. The chemically strengthened glass according to claim 5, wherein the glass has a molar ratio $[Li_2O]/[K_2O]$ of $Li_2O$ and $K_2O$ in the base composition of the chemically strengthened glass of 1 to 10.

10. The chemically strengthened glass according to claim 5, wherein the glass has an entropy function S value of 0.35 or less in the base composition of the glass according to formula $S=-P_{Li}\times\log(P_{Li})-P_{Na}\times\log(P_{Na})-P_K\times\log(P_K)$, where $P_K=[K_2O]/([Li_2O]+[Na_2O]+[K_2O])$, and $[Li_2O]$, $[Na_2O]$, and $[K_2O]$ represent contents, in mol %, of $Li_2O$, $Na_2O$, and $K_2O$, respectively.

11. An electronic device, comprising:
the chemically strengthened glass of claim 1.

12. A method of manufacturing the chemically strengthened glass according to claim 1, the method comprising:
immersing a glass sheet comprising a lithium aluminosilicate glass in a sodium-containing salt at 380° C. to 500° C. for 1 to 8 hours; and
immersing the glass in a potassium-containing salt to obtain the chemically strengthened glass according to claim 1,
wherein the sodium-containing salt comprises 50 mass % or more of sodium ions assuming that a mass of metal ions in a molten salt is 100 mass %.

13. The method of a chemically strengthened glass according to claim 12, wherein the lithium aluminosilicate glass comprises, in mol % on an oxide basis:
from 58 to 70% of $SiO_2$;
from 7 to 20% of $Al_2O_3$;
from 2 to 20% of $Li_2O$;
from 0 to 2% of $Na_2O$;
from 2 to 6% of $K_2O$;
from 0 to 2% of $B_2O_3$;
from 0 to 2% of $P_2O_5$;
from 0.1 to 3% of either one or more kinds of $ZrO_2$ and $TiO_2$ in total; and
from 0 to 15%, in total, of at least one selected from the group consisting of MgO, ZnO, CaO, SrO, and BaO.

14. The method of a chemically strengthened glass according to claim 12, wherein the lithium aluminosilicate glass comprises, in mass % on an oxide basis:
from 45 to 70% of $SiO_2$;
from 10 to 25% of $Al_2O_3$;
from 2.5 to 10% of $Li_2O$;
from 0 to 4% of $Na_2O$;
from 2 to 10% of $K_2O$;
from 0 to 10% of $B_2O_3$;
from 0 to 10% of $P_2O_5$;
from 0.2 to 5% of either one or more kinds of $ZrO_2$ and $TiO_2$ in total; and
from 0 to 15%, in total, of at least one selected from the group consisting of MgO, ZnO, CaO, SrO, and BaO.

15. A method of manufacturing the chemically strengthened glass according to claim 1, the method comprising bringing a glass for chemical strengthening into contact with a sodium-containing salt at 380 to 500° C., then bringing the glass for chemical strengthening into contact with a potassium-containing salt at 380 to 500° C.,
wherein the glass for chemical strengthening comprises, in mol % on an oxide basis:
from 50 to 70% of $SiO_2$;
from 7 to 25% of $Al_2O_3$;
from 2 to 20% of $Li_2O$;
from 0 to 4% of $Na_2O$;
from 2 to 8% of $K_2O$;
from 0 to 10% of $B_2O_3$;
from 0 to 10% of $P_2O_5$;
from 15% or less, in total, of at least one selected from the group consisting of MgO, ZnO, CaO, SrO, and BaO; and 5% or less, in total, of at least one selected from the group consisting of $ZrO_2$ and $TiO_2$,
the sodium-containing salt comprises 80% or more of sodium ions assuming that a mass of metal ions contained in the sodium-containing salt is 100%, and
a contact time with the potassium-containing salt is shorter than a contact time with the sodium-containing salt.

16. The method of a chemically strengthened glass according to claim 15, wherein the glass for chemical strengthening comprises, in mol % on an oxide basis:
from 58 to 70% of $SiO_2$;
from 7 to 20% of $Al_2O_3$;
from 0 to 2% of $B_2O_3$;
from 0 to 2% of $P_2O_5$;
from 2 to 20% of $Li_2O$;
from 0 to 2% of $Na_2O$;
from 2 to 6% of $K_2O$;
from 0.1 to 3% of $ZrO_2+TiO_2$;
1% or less of $TiO_2$;
from 0 to 15% of $MgO+ZnO+CaO+SrO+BaO$;
1% or less of SrO; and
1% or less of BaO.

17. A glass comprising, in mol % on an oxide basis:
from 58 to 70% of $SiO_2$;
from 7 to 20% of $Al_2O_3$;
from 2 to 20% of $Li_2O$;
from 0 to 2% of $Na_2O$;
from 2 to 6% of $K_2O$;
from 0 to 2% of $B_2O_3$;
from 0 to 2% of $P_2O_5$;

from 0.1 to 3% in total, of at least one selected from the group consisting of $ZrO_2$ and $TiO_2$; and from 0 to 15%, in total, of at least one selected from the group consisting of MgO, ZnO, CaO, SrO and BaO, wherein the glass, without being chemically strengthened, has a surface resistivity of $10^{13.5}\Omega$ or less.

18. The glass according to claim 17, wherein the glass has an entropy function S value of 0.35 or less according to formula $S=-P_{Li}\times\log(P_{Li})-P_{Na}\times\log(P_{Na})-P_{K}\times\log(P_{K})$, where $P_{Li}=[Li_2O]/([Li_2O]+[Na_2O]+[K_2O])$, $P_{Na}=[Na_2O]/([Li_2O]+[Na_2O]+[K_2O])$, $P_{K}=[K_2O]/([Li_2O]+[Na_2O]+[K_2O])$, and $[Li_2O]$, $[Na_2O]$, and $[K_2O]$ represent contents, in mol %, of $Li_2O$, $Na_2O$, and $K_2O$, respectively.

19. A glass comprising, in mass % on an oxide basis:

from 45 to 70% of $SiO_2$;

from 10 to 25% of $Al_2O_3$;

from 5 to 10% of $Li_2O$;

from 0 to 4% of $Na_2O$;

from 2 to 10% of $K_2O$;

from 0 to 10% of $B_2O_3$;

from 0 to 10% of $P_2O_5$;

from 0.2 to 5% in total, of at least one selected from the group consisting of $ZrO_2$ and $TiO_2$; and from 0 to 15%, in total, of at least one selected from the group consisting of MgO, ZnO, CaO, SrO and BaO, wherein the glass, without being chemically strengthened, has a surface resistivity of $10^{13.5}\Omega$ or less.

\* \* \* \* \*